(12) United States Patent
Kawamoto

(10) Patent No.: US 12,316,813 B2
(45) Date of Patent: *May 27, 2025

(54) CONTROLLING DISPLAY OF PREVIEW PRINT IMAGES AT DIFFERENT ANGLES OF VISUAL RECOGNITION BY PERFORMING COLOR CONVERSION CORRESPONDING TO THE STRUCTURAL COLOR INK

(71) Applicant: FUJIFILM CORPORATION, Tokyo (JP)

(72) Inventor: Takuma Kawamoto, Tokyo (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/544,489

(22) Filed: Dec. 19, 2023

(65) Prior Publication Data

US 2024/0223709 A1 Jul. 4, 2024

(30) Foreign Application Priority Data

Dec. 28, 2022 (JP) .................................. 2022-212332

(51) Int. Cl.
H04N 1/00 (2006.01)
H04N 1/60 (2006.01)

(52) U.S. Cl.
CPC ....... H04N 1/00506 (2013.01); H04N 1/0044 (2013.01); H04N 1/6088 (2013.01)

(58) Field of Classification Search
CPC ............. G09G 5/02; G09G 2320/0276; G09G 2340/06; G09G 3/2003; G09G 2320/0666;

(Continued)

(56) References Cited

U.S. PATENT DOCUMENTS 8,724,169 B2 * 5/2014 Itami .................. G03G 15/5062
358/1.9
11,914,910 B2 * 2/2024 Matsubara ............ G06F 3/1208
(Continued)

FOREIGN PATENT DOCUMENTS

JP 2004-206175 A 7/2004
JP 2012161080 A * 8/2012
(Continued)

OTHER PUBLICATIONS

English language translation the JPO action dated Apr. 10, 2023 in a Japanese patent application No. 2022-212332 corresponding to the instant patent application.*

(Continued)

Primary Examiner — Scott A Rogers
(74) Attorney, Agent, or Firm — SOLARIS Intellectual Property Group, PLLC

(57) ABSTRACT

A display control device controls a display screen for displaying a preview of a print image to be printed on a recording medium by using an ink. The print image is printed using, as the ink, a structural color ink of which a color changes due to an optical phenomenon caused by a structure, and a color of the print image changes depending on an angle of visual recognition. The display control device includes: a processor. In a case where the print image is visually recognized at different angles, the processor is configured to display, on the display screen, a plurality of preview images corresponding to the angles by performing color conversion processing corresponding to the structural color ink.

10 Claims, 22 Drawing Sheets

(58) Field of Classification Search
CPC ....... G09G 2320/0693; G09G 2340/00; G09G 2354/00; H04N 1/0044; H04N 1/00442; H04N 1/00506; H04N 1/6088
See application file for complete search history.

(56) References Cited

U.S. PATENT DOCUMENTS

| | | | |
|---|---|---|---|
| 12,064,924 B2* | 8/2024 | Yamada | B29C 64/209 |
| 12,148,077 B2* | 11/2024 | Iskandar | G06F 3/017 |
| 2004/0120596 A1 | 6/2004 | Ishii et al. | |
| 2015/0036193 A1 | 2/2015 | Nakano et al. | |
| 2015/0130808 A1* | 5/2015 | Takagi | G06F 1/1626 |
| | | | 345/428 |
| 2015/0283825 A1 | 10/2015 | Takai et al. | |
| 2022/0212412 A1 | 7/2022 | Yamada et al. | |
| 2024/0111464 A1* | 4/2024 | Ono | G06F 3/1208 |
| 2024/0126484 A1* | 4/2024 | Ono | G06F 3/1256 |
| 2024/0135636 A1* | 4/2024 | Ono | G06V 10/56 |
| 2024/0319942 A1* | 9/2024 | Takaishi | G06V 10/60 |

FOREIGN PATENT DOCUMENTS

| | | | |
|---|---|---|---|
| JP | 2013-255098 A | | 12/2013 |
| JP | 2014-100635 A | | 6/2014 |
| JP | 2015-33016 | | 2/2015 |
| JP | 2015-183064 A | | 10/2015 |
| JP | 2015198436 A | * | 11/2015 |
| JP | 2021-66026 A | | 4/2021 |
| JP | 2022-106472 A | | 7/2022 |

OTHER PUBLICATIONS

English language translation the JPO action dated May 22, 2023 in a Japanese patent application No. 2022-212332 corresponding to the instant patent application.*

English language translation the JPO action dated Oct. 27, 2023 in a Japanese patent application No. 2022-212332 corresponding to the instant patent application.*

"New development of 'Structural Color Inkjet Technology', a decorative technique that achieves high design quality through the same coloration phenomenon as morpho butterflies and jewel beetles", [online], [searched on Apr. 10, Reiwa 5], Fujifilm Corporation, Mar. 23, 2022, full text, all figures, Internet <https://www.fujifilm.com/jp/ja/news/list/7724>.

English language translation of the following: Office action dated Apr. 18, 2023 from the JPO in a Japanese patent application No. 2022-212332 corresponding to the instant patent application. This office action translation is submitted now in order to supplement the understanding of the cited references which are being disclosed in the instant Information Disclosure Statement.

English language translation of the following: Office action dated Aug. 8, 2023 from the JPO in a Japanese patent application No. 2022-212332 corresponding to the instant patent application. This office action translation is submitted now in order to supplement the understanding of the cited references which are being disclosed in the instant Information Disclosure Statement.

* cited by examiner

FIG. 20
PRINT IMAGE: P002
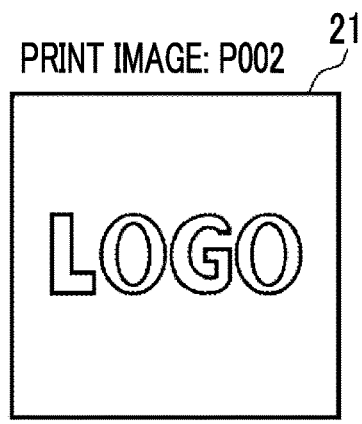
PRINT IMAGE: P003
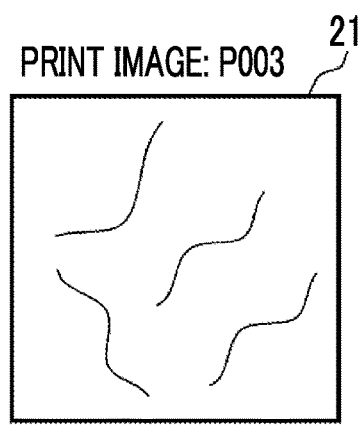
PRINT IMAGE: P004
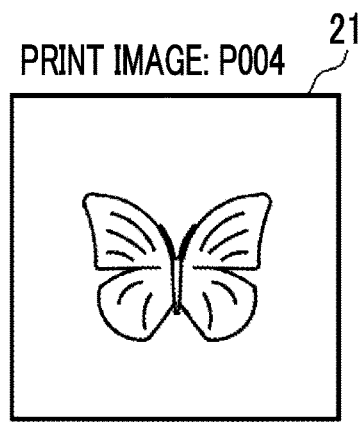

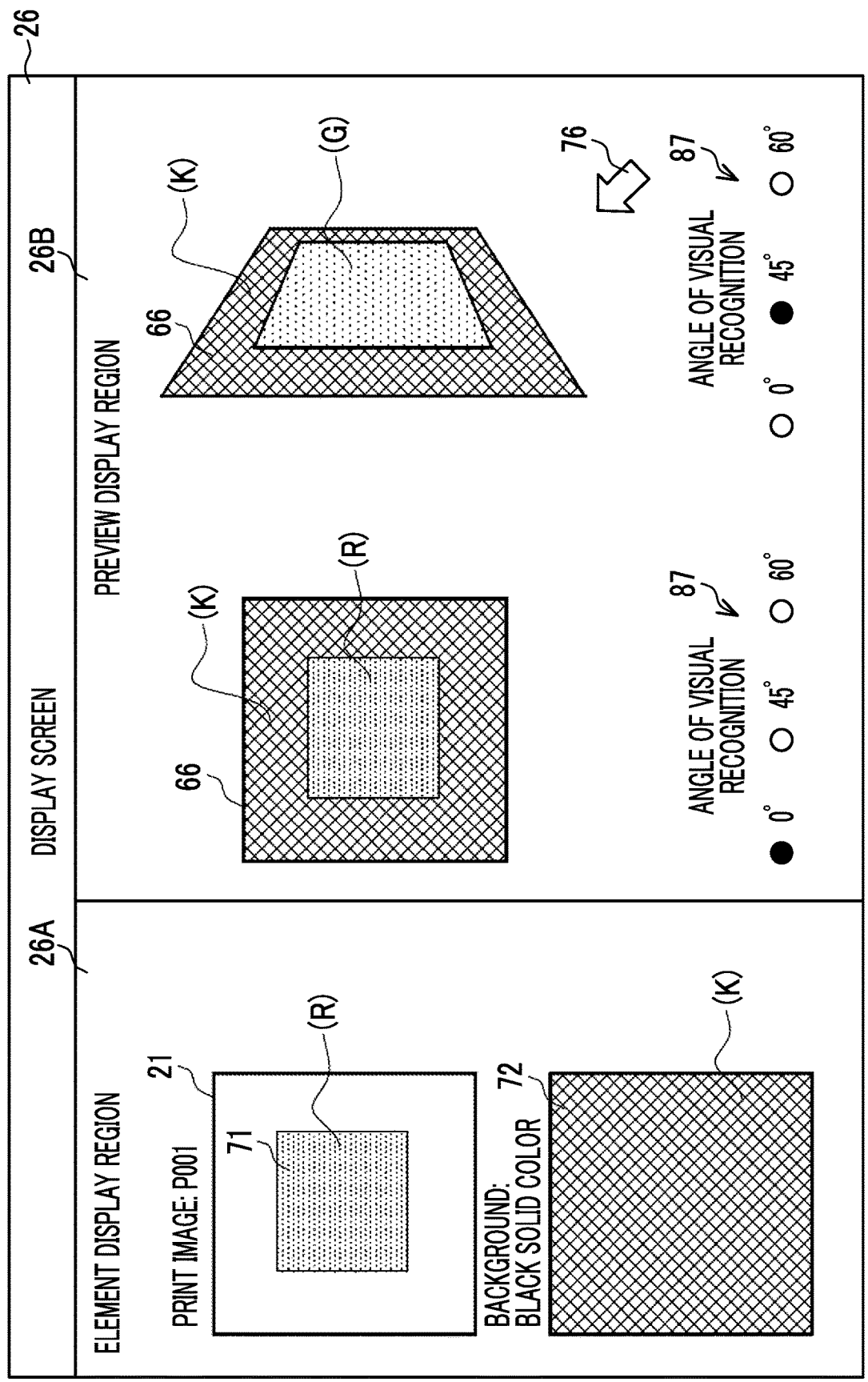

CONTROLLING DISPLAY OF PREVIEW PRINT IMAGES AT DIFFERENT ANGLES OF VISUAL RECOGNITION BY PERFORMING COLOR CONVERSION CORRESPONDING TO THE STRUCTURAL COLOR INK

CROSS-REFERENCE TO RELATED APPLICATIONS

The present application claims priority under 35 U.S.C. § 119 to Japanese Patent Application No. 2022-212332 filed on Dec. 28, 2022. The above application is hereby expressly incorporated by reference, in its entirety, into the present application.

BACKGROUND

1. Technical Field

The technique of the present disclosure relates to a display control device, a method of operating a display control device, and a program for operating a display control device.

2. Description of the Related Art

A display control device that controls a display screen for displaying a preview of a print image to be printed on a recording medium is known (for example, refer to JP2015-33016A). The display control device disclosed in JP2015-33016A is able to preview a print image printed on a lenticular sheet. The lenticular sheet is a combination of a recording medium, on which a print image is printed, and a lenticular lens. As a matter of common knowledge, the lenticular lens is a lens in which a plurality of striped ridge lenses are arranged. For example, two types of a first image and a second image are printed as print images on the recording medium, and each of the first image and the second image is divided into striped images each corresponding to a width of a ridge lens. In such a state, the striped images of each of the first image and the second image are alternately arranged along an arrangement direction of the plurality of ridge lenses.

In the lenticular sheet, the striped image of either the first image or the second image is selectively visually recognized in accordance with an angle of visual recognition by an action of the lenticular lens. Therefore, in a case where the angle of visual recognition is changed, the visually recognized print image is switched between the first image and the second image. Thereby, in the lenticular sheet, it is possible to enjoy change in color, pattern, and the like between the first image and the second image by changing the angle of visual recognition. Further, in the lenticular sheet, it is also possible to visually recognize a virtual stereo image based on the first image and the second image by using a difference in angles of visual recognition of left and right eyes, which is caused by a visual difference between the left and right eyes.

In the lenticular sheet, normal ink is used for printing on the recording medium. The normal ink is an ink using a coloring material that develops color by reflecting light in a specific wavelength region and absorbing light in other wavelength regions.

SUMMARY

Meanwhile, a structural color ink having a color development principle different from that of the normal ink is known. The structural color ink is different from the normal ink in that the ink itself is transparent. However, the structural color ink is an ink that develops color due to an optical phenomenon, such as refraction, interference, diffraction, and scattering of light, caused by a structure of the ink. The color of the print image changes depending on the angle of visual recognition, in accordance with the type of the structural color ink. As described above, the structural color ink has a color development principle that is significantly different from that of the normal ink. Therefore, in a case where structural color inks are used, there is a problem in that it is extremely difficult for a user to visualize how the print image will look before printing.

In JP2015-33016A, in the lenticular sheet in which a plurality of print images are switched depending on the angle of visual recognition, preview images of the switched print images are displayed. However, this is a case where a plurality of print images are only selectively displayed. Meanwhile, the structural color ink changes in color due to the optical phenomenon caused by the structure thereof. Therefore, it is not possible to display an appropriate preview image corresponding to the angle of visual recognition for the print image using the structural color ink, by simply switching between the plurality of print images to be displayed as in the lenticular sheet.

The technique of the present disclosure provides a display control device, a method of operating a display control device, and a program for operating a display control device capable of checking, before printing, change in color depending on the angle of visual recognition for the print image printed with the structural color ink.

According to an aspect of the present disclosure, there is provided a display control device that controls a display screen for displaying a preview of a print image to be printed on a recording medium by using an ink. The print image is printed using, as the ink, a structural color ink of which a color changes due to an optical phenomenon caused by a structure, and a color of the print image changes depending on an angle of visual recognition. The display control device includes: a processor. In a case where the print image is visually recognized at different angles, the processor is configured to display, on the display screen, a plurality of preview images corresponding to the angles by performing color conversion processing corresponding to the structural color ink.

For example, the processor is configured to receive designation of the angles.

For example, the processor is configured to display an object of which a posture is changeable through an operation of a user, on the display screen, and receive the designation of the angles in accordance with the posture of the object.

For example, the object is the preview images.

For example, the object is an object different from the preview images.

For example, the designation of the angles is received by selecting the angles from a plurality of angles set in advance or by inputting an arbitrary numerical value.

For example, the processor is configured to display a plurality of preview images corresponding to a plurality of angles set in advance.

For example, the display screen is provided with a region for receiving designation of the angles.

According to an aspect of the present disclosure, there is provided a method of operating a display control device that controls a display screen for displaying a preview of a print image to be printed on a recording medium by using an ink. The print image is printed using, as the ink, a structural color ink of which a color changes due to an optical phenomenon caused by a structure, and a color of the print image changes depending on an angle of visual recognition. The display control device includes a processor. The method comprises: in a case where the print image is visually recognized at different angles, executing, through the processor, processing of displaying, on the display screen, a plurality of preview images corresponding to the angles by performing color conversion processing corresponding to the structural color ink.

According to an aspect of the present disclosure, there is provided a program for operating a display control device causing a computer to function as a display control device that controls a display screen for displaying a preview of a print image to be printed on a recording medium using an ink. The print image is printed using, as the ink, a structural color ink of which a color changes due to an optical phenomenon caused by a structure, and a color of the print image changes depending on an angle of visual recognition.

The program causes the computer to execute, in a case where the print image is visually recognized at different angles, processing of displaying, on the display screen, a plurality of preview images corresponding to the angles by performing color conversion processing corresponding to the structural color ink.

According to the technique of the present disclosure, it is possible to check, before printing, change in color depending on the angle of visual recognition of the print image printed with the structural color ink.

BRIEF DESCRIPTION OF THE DRAWINGS

FIG. 20 is a diagram showing variation of the print image.

FIG. 25 is a diagram showing a modification example of a tool for designating the angle of visual recognition.

DETAILED DESCRIPTION

Figure 1:
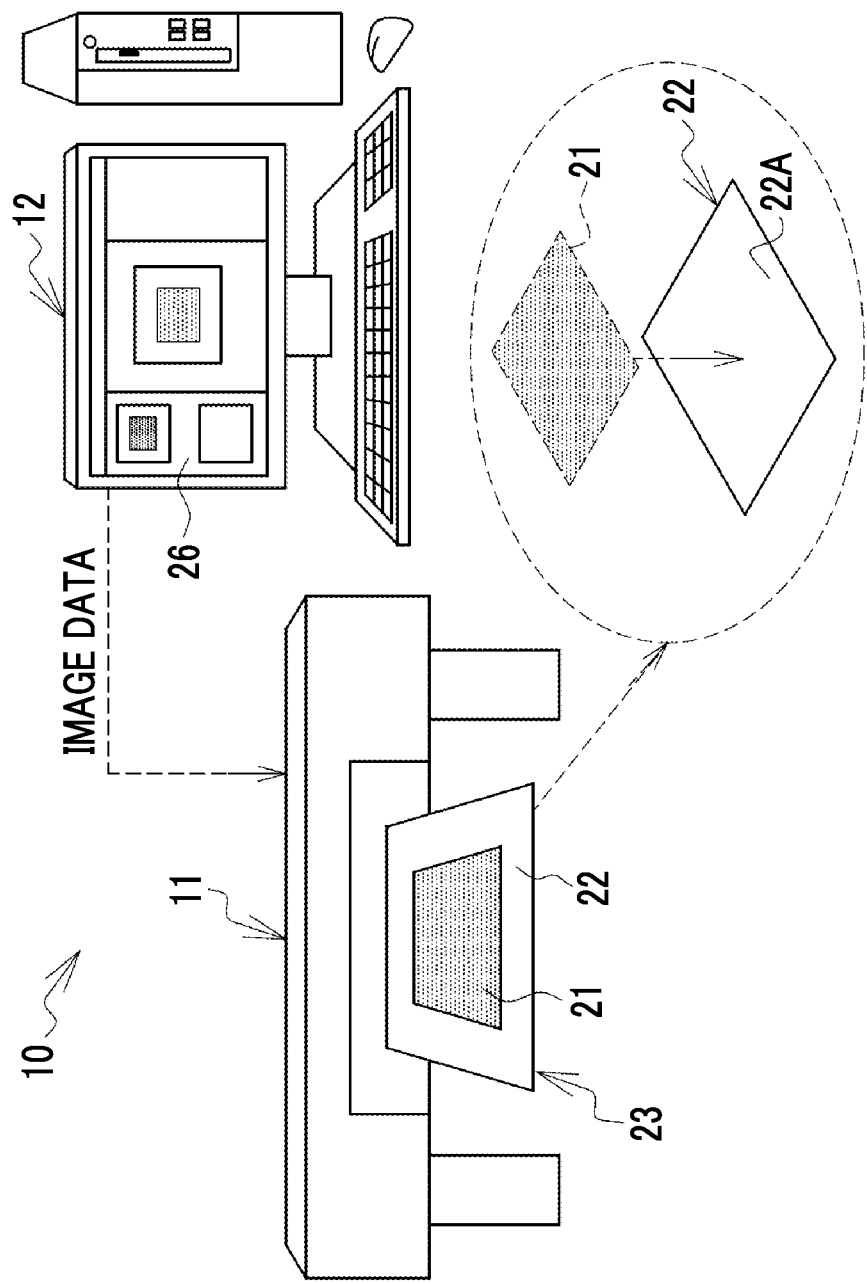
FIG. 1 is a diagram showing a printing system comprising an operational terminal and a printer.

As shown in FIG. 1 as an example, a printing system 10 comprises a printer 11 and an operational terminal 12. The printer 11 prints a print image 21 on a recording medium 22, such as a sheet, using ink and outputs a printed material 23. For example, the printer 11 is an inkjet type printer that prints the print image 21 by ejecting droplets of ink onto a recording surface 22A of the recording medium 22. The operational terminal 12 is an operational terminal that operates the printer 11, and is able to input operation instructions such as designation of the print image 21, setting of printing conditions, and a printing start-up instruction. The operational terminal 12 has a function of displaying a display screen 26 for displaying a preview of the print image 21 before printing. The preview display means displaying a preview image on the display screen 26. The operational terminal 12 is an example of a display control device according to the technique of the present disclosure.

The printer 11 uses a structural color ink 40 (refer to FIGS. 5 and 6, and the like) as the ink. The structural color ink 40 is an ink that is different from a normal ink containing a coloring agent, and the ink itself is colorless. However, the ink means an ink for developing color due to an optical phenomenon, such as refraction, interference, diffraction, or scattering of light, caused by a structure of the ink. According to the type of the structural color ink 40, the color of the print image 21 changes depending on an angle of visual recognition, or appearance including the color changes depending on a background.

Figure 2:
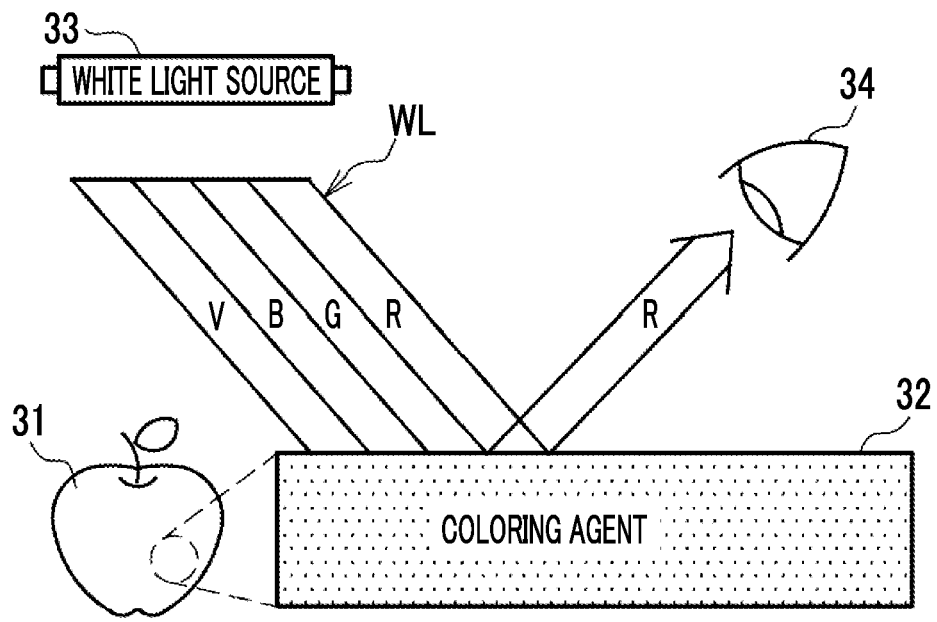
FIG. 2 is a diagram showing a color development principle of a coloring agent.
Figure 3:
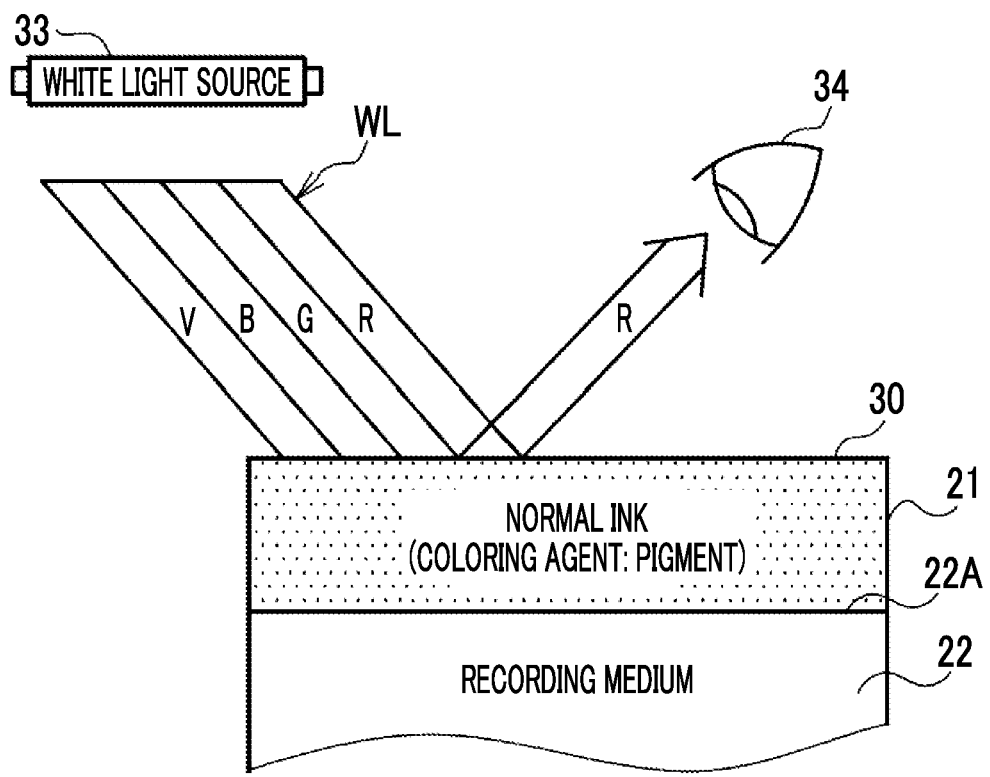
FIG. 3 is a diagram showing a color development principle of a normal ink having a coloring agent.

The structural color ink 40 will be described with reference to FIGS. 2 to 9. First, a color development principle of a normal ink 30 to be compared with will be described using FIGS. 2 and 3. The normal ink 30 (refer to FIG. 3) has a coloring agent that reflects light with a specific wavelength and that absorbs light in other wavelength regions. As shown in FIG. 2, a skin of an apple 31 has a red coloring agent 32. Thus, in a case where the red coloring agent 32 is irradiated with white light WL emitted from a white light source 33 such as the sun or a fluorescent lamp, the skin reflects a red component (hereinafter, referred to as R light) included in white light WL and absorbs the other components. In FIGS. 2 and 3, the white light WL includes a green component (hereinafter, referred to as G light), a blue component (hereinafter, referred to as B light), and a violet component (hereinafter, referred to as V light) in addition to R light. Thus, the red coloring agent 32 absorbs the G light, the B light, and the V light other than the R light.

Since only the reflected R light is incident on eyes of a viewer 34 who visually recognizes the apple 31, the apple 31 is recognized to be red. As shown in FIG. 3, the normal ink 30 contains a pigment as the coloring agent 32, as an example. In a case where the print image 21 is printed on the recording medium 22 by using the normal ink 30, the normal ink 30 adheres to the recording surface 22A of the recording medium 22, and colors the recording surface 22A. Similar to the skin of the apple 31, the normal ink 30 reflects light in a specific wavelength region, such as the R light, and absorbs light in other wavelength regions through an action of the coloring agent 32. The normal ink 30 develops color due to an action of reflection and absorption of light in the coloring agent 32, and the color thereof is recognized.

Figure 4:
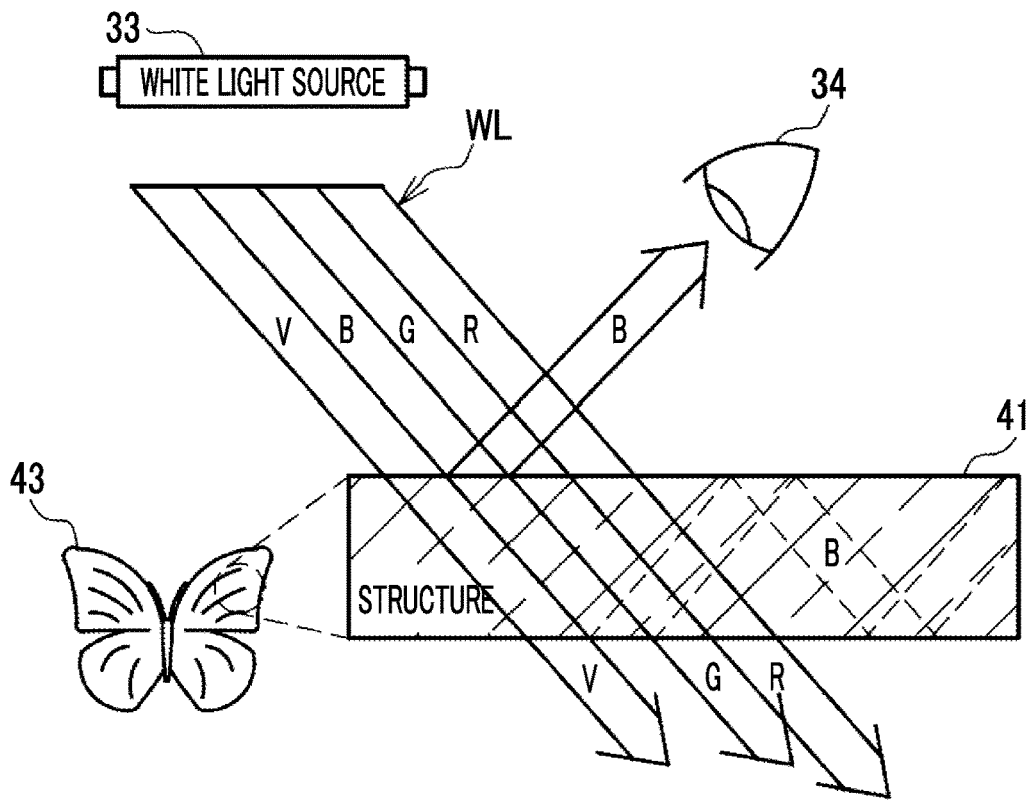
FIG. 4 is a diagram showing a color development principle of a structure.

Meanwhile, as shown in FIG. 4, the structural color refers to a color that is developed due to a fine structure of a structure 41. A typical example of the structure 41 is a wing of an insect such as a butterfly 43. The structure 41 itself is colorless and develops color due to an optical phenomenon, such as refraction, interference, diffraction, or scattering of light, caused by the fine structure of the structure 41. For example, in a case where the structure 41 shown in FIG. 4 is visually recognized at a certain angle, the structure 41 appears in blue. For example, the structure 41 has optical characteristics in which, in a case where visual recognition is performed at a certain angle, light in a specific wavelength region is accentuated by an interference action of light in the white light WL as illumination light. In the example shown in FIG. 4, the structure 41 has an optical characteristic in which the B light is accentuated by an interference action of light in the white light WL as illumination light. FIG. 4 schematically shows the color development principle. That is, an amount of B light in the reflected light reflected from the interface of the structure 41 is large, and amounts of the other V light, G light, and R light in the reflected light are relatively small. Thus, the V light, the G light, and the R light are transmitted through the structure 41. The B light having a relatively large amount of light reflected at an interface of the structure 41 is strongly recognized by the eyes of the viewer 34. Therefore, the structure 41 is recognized to be blue from the viewpoint of the viewer 34. As a matter of course, light other than the B light may be incident on the eyes of the viewer 34 due to an action of diffuse reflection or the like in the structure 41. In such a case, although blue is dominant, the blue is not pure blue but is recognized as a color mixed with other colors.

Further, as indicated by a broken line inside the structure 41, the remaining B light, which is not reflected, is incident into the structure 41. The B light incident into the structural color ink 40 is repeatedly reflected at the interface of the structure 41, and thereby the B light remains inside the structural color ink 40, and an amount of light emitted to the outside of the structure 41 again is small. Further, as described below, the structure 41 has a characteristic in which the color changes depending on the angle of visual recognition in accordance with the type of the structure 41. Thus, in such a structure 41, in a case where visual recognition is performed at a certain angle, the B light is accentuated. However, in a case where visual recognition is performed at a different angle, light with a different color is accentuated.

Figure 5:
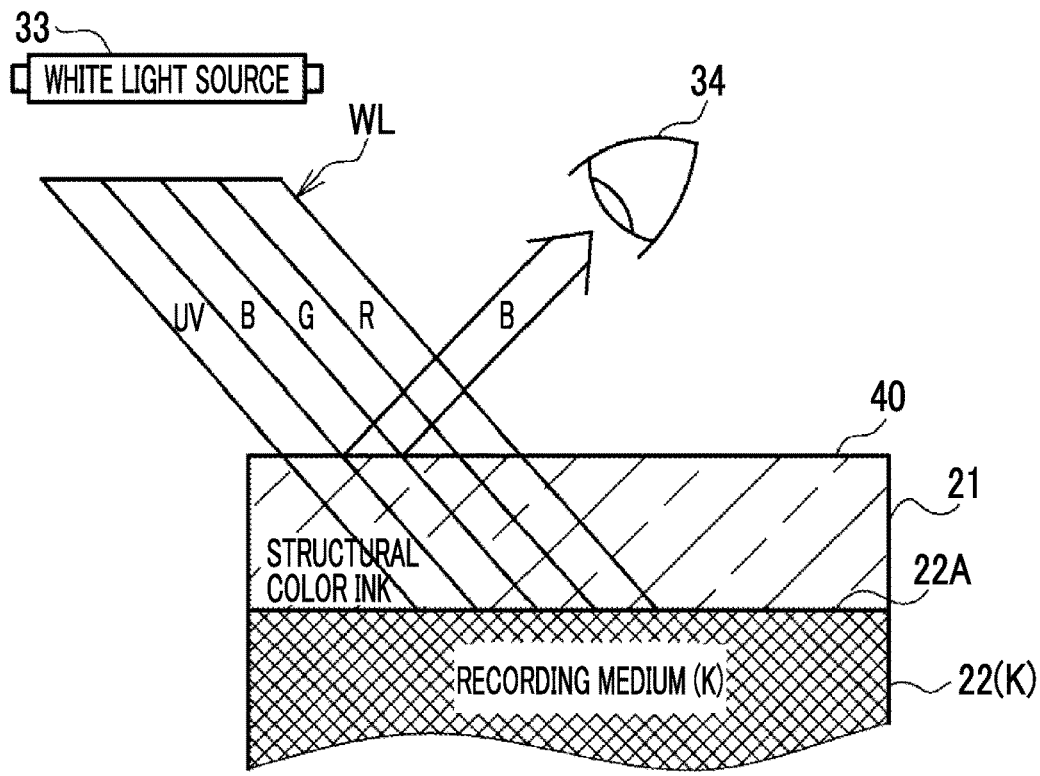
FIG. 5 is a diagram showing a color development principle of a structural color ink.
Figure 6:
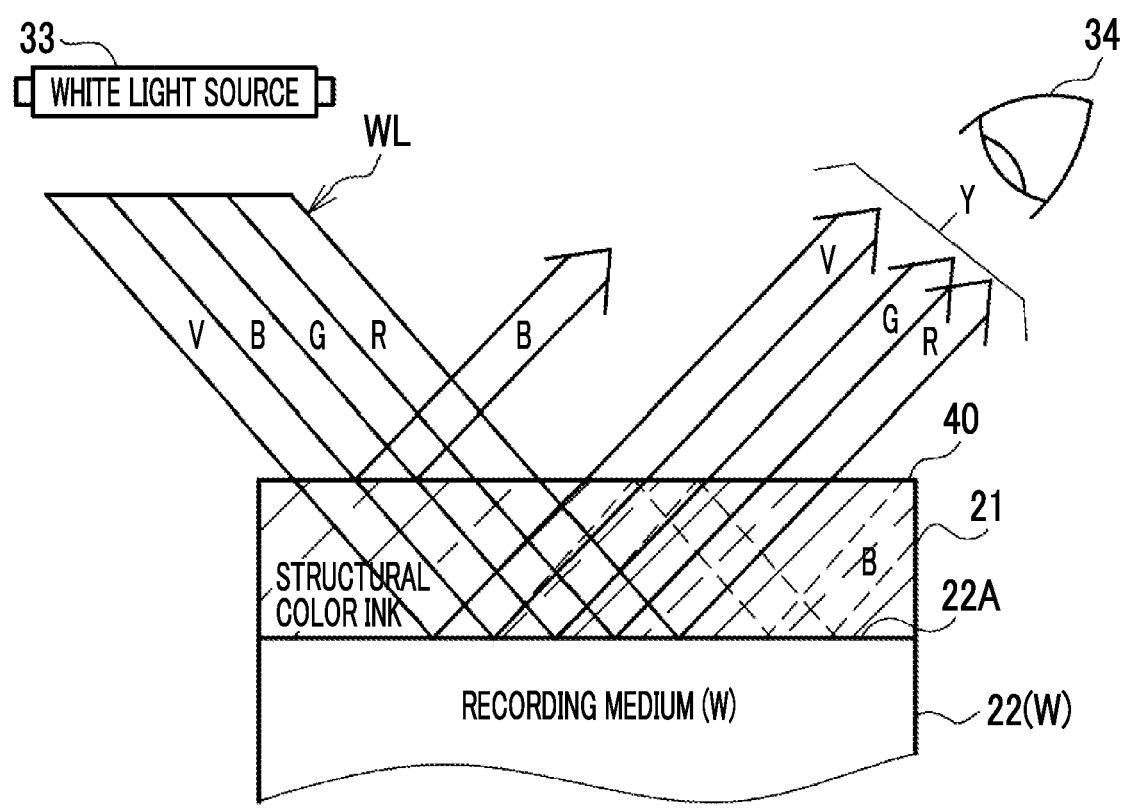
FIG. 6 is a diagram showing a color development principle of a structural color ink in which a background color is different from that of FIG. 5.

The structural color ink 40 shown in FIGS. 5 and 6 is an ink in which a fine structure having optical characteristics as in the structure 41 shown in FIG. 4 is formed artificially. Specifically, in the structural color ink 40, not only a thin film structure or a multilayer film structure, which has a thickness having an order corresponding to a wavelength of light and causes interference of light, is formed, but also an uneven structure, which has a width having an order corresponding to the wavelength of light and causes diffraction of light, and the like are formed.

Background Dependence of Color of Structural Color Ink

Unlike the normal ink 30 having a property of absorbing light, the structural color ink 40 of the present example has a property of transmitting light. Therefore, the color of the print image 21 printed using the structural color ink 40 changes due to influence of a background. That is, the color of the structural color ink 40 has a background dependence that depends on the color of the background. The background dependence of the color of the structural color ink 40 will be described with reference to FIGS. 5 and 6. FIG. 5 shows a state in which the print image 21 is printed on the recording medium 22 of which the recording surface 22A is black (K indicates black in FIG. 5), by using the structural color ink 40. FIG. 6 shows a state in which the print image 21 is printed on the recording medium 22 of which the recording surface 22A is white (W indicates white in FIG. 6), by using the structural color ink 40. Here, in a case of distinguishing whether the color of the recording surface 22A of the recording medium 22 is black (K) or white (W), the recording medium 22 is denoted by a subdivided reference numeral, like the recording medium 22(K) or the recording medium 22(W). The color of the recording surface 22A is a color of the recording medium 22 itself, and is a base of the print image 21. The recording surface 22A is an example of the "background" according to the technique of the present disclosure. In the examples shown in FIGS. 5 and 6, the recording surface 22A includes the coloring agent 32 instead of the structural color ink 40, and develops color of black or white due to an action of absorption and reflection of light of the coloring agent 32.

As shown in FIG. 5, in a case where the background of the structural color ink 40 is black (K), the background of black (K) absorbs light transmitted through the structural color ink 40. Therefore, the viewer 34 strongly recognizes the color of the B light, of which the amount of reflected light reflected in the structural color ink 40 is relatively large, in the white light WL. Therefore, in a case where the background is black (K), the color of the structural color ink 40, which is visually recognized by the viewer 34, is blue.

On the other hand, as shown in FIG. 6, in a case where the background of the structural color ink 40 is white (W), the background of white (W) reflects the light transmitted through the structural color ink 40. The light, which is reflected from the background of white (W), is transmitted through the inside of the structure 41 and is emitted from a surface on which the white light WL is incident. Therefore, the light (V light, G light, and R light) other than the B light in the white light WL is also incident on the eyes of the viewer 34. That is, the components of the white light WL including the B light are incident on the eyes of the viewer 34. However, the B light, which is incident into the structural color ink 40, is repeatedly reflected at the interface of the structure 41 and thereby remains inside the structural color ink 40. Therefore, in the light directed to the eyes of the viewer 34, the amount of light is relatively reduced as compared with the light other than the B light. As a result, in the light incident on the eyes of the viewer 34, the light other than the B light is dominant. Thus, in a case where the background is white, the viewer 34 recognizes the color of the structural color ink 40 as yellow (which is denoted by Y in FIG. 6) which is a complementary color of blue. As described above, unlike the normal ink 30, the structural color ink 40 has a characteristic of transmitting light. Thus, the color of the print image 21 printed using the structural color ink 40 changes depending on the background.

Angle Dependence of Color of Structural Color Ink

Figure 7:
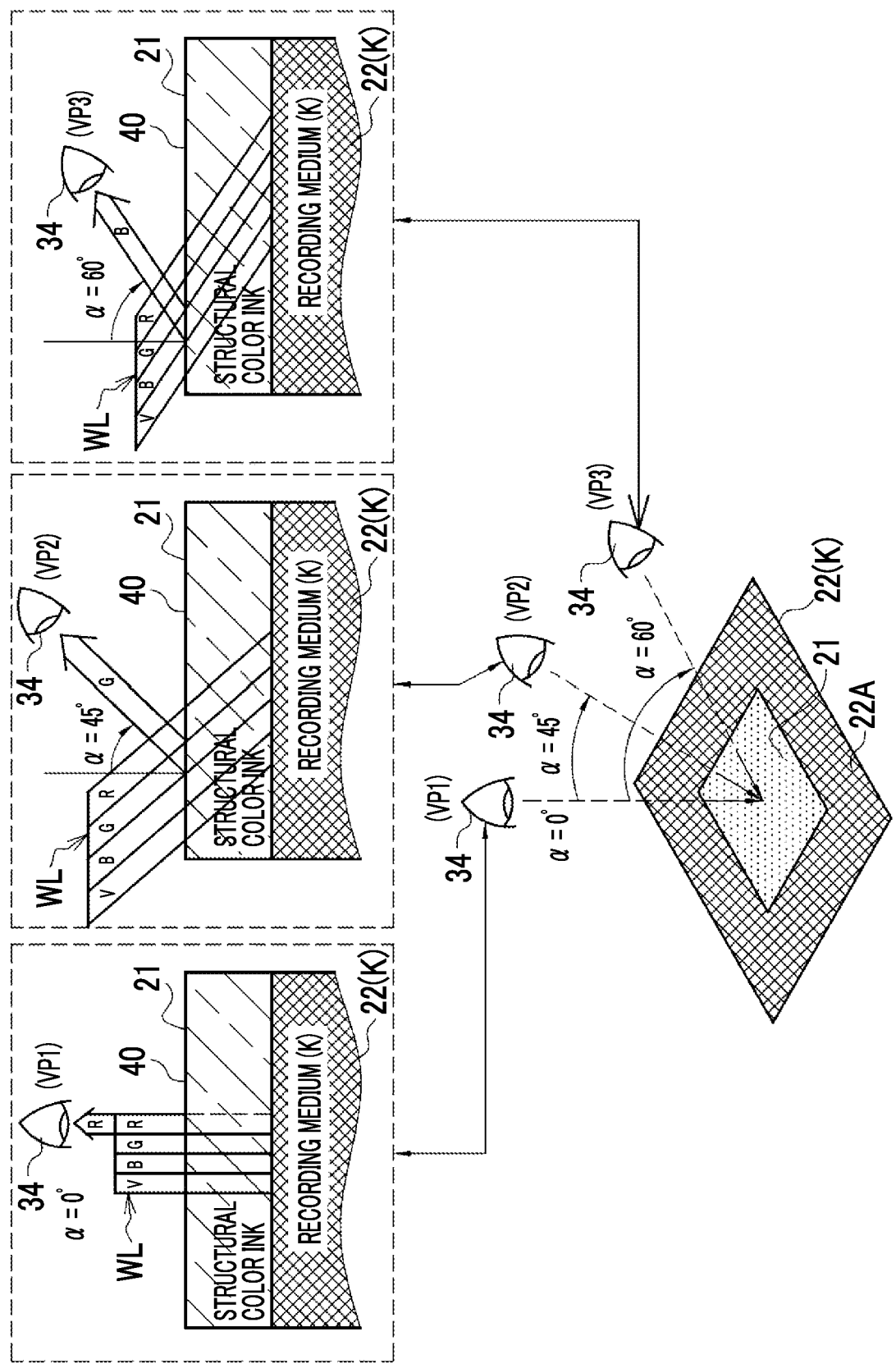
FIG. 7 is a diagram showing change in color depending on an angle of visual recognition in a case where a background is black.
Figure 8:
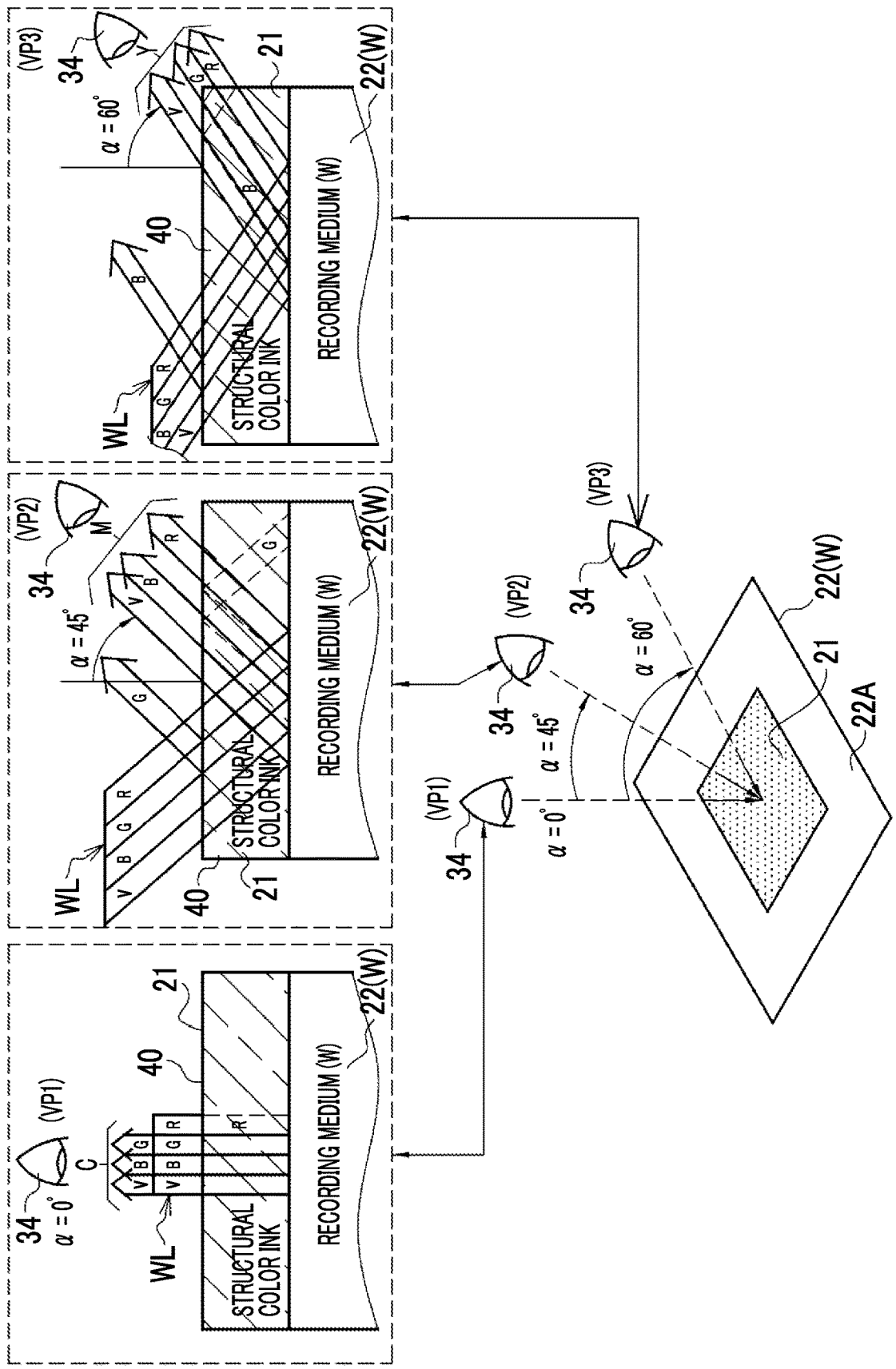
FIG. 8 is a diagram showing change in color depending on an angle of visual recognition in a case where the background is white.

Further, the color of the print image 21 using the structural color ink 40 of the present example changes depending on an angle α of visual recognition. That is, the color of the structural color ink 40 of the present example has an angle dependence in which the color changes depending on the angle α of visual recognition for the print image 21. The angle dependence of the color of the structural color ink 40 will be described with reference to FIGS. 7 and 8. FIGS. 7 and 8 each show a state in which the color changes depending on the angle α at which the viewer 34 visually recognizes the print image 21 printed with the structural color ink 40. A viewpoint VP1 is a viewpoint of visually recognizing the print image 21 from a normal direction of the recording surface 22A, that is, a front thereof. Here, the angle α of visual recognition is defined by an inclination angle with a normal line of the recording surface 22A as a reference. The viewpoint VP1, in which the print image 21 is visually recognized from the front, serves as a reference of the angle α of visual recognition. Thus, the viewpoint VP1 is "0°". The angle α of visual recognition at a viewpoint VP2 is, for example, "45°", and the angle α of visual recognition at a viewpoint VP3 is, for example, "60°". In FIG. 7, the recording medium 22(K) of which the recording surface 22A is black (K) is used. In FIG. 8, the recording medium 22(W) of which the recording surface 22A is white (W) is used. Thus, the colors of the backgrounds are different.

Further, as shown in the viewpoint VP1 of FIG. 7, the structural color ink 40 shown in FIGS. 7 and 8 has a black (K) background and is recognized to be red (R) in a case where the ink is visually recognized from the front (in a case where the angle α of visual recognition is "0°"). That is, in the structural color ink 40, an amount of reflected light of R light reflected in the normal direction of the recording surface 22A in the white light WL as illumination light is relatively large. In addition, the amount of reflected light of the remaining V light, B light, and G light other than the R light is relatively small. The light other than the R light is transmitted through the inside of the structural color ink 40 and reaches the background. However, the light is absorbed because the background is black. Therefore, in a case where the R light is visually recognized at the viewpoint VP1, the color of the R light is strongly recognized.

Further, in a case where the background of the structural color ink 40 of the present example is black (K), the color to be recognized changes to a short wavelength side as the angle α of visual recognition increases. That is, as shown in the viewpoint VP2, in a case where the angle α of visual recognition is "45°", the amount of reflected light of the G light having a wavelength shorter than that of the R light is increased and the G light is recognized to be green (G). Further, as shown in the viewpoint VP3, in a case where the angle α of visual recognition is "60°", the amount of reflected light of the B light having a wavelength shorter than that of the G light is increased and the B light is recognized to be blue (B).

FIG. 8 shows an example in which the recording medium 22(W) having the white background color is used. The structural color ink 40 is the same as that in FIG. 7. As described with reference to FIG. 6, in the structural color ink 40, the color recognized in a case where the background is white (W) is complementary to the color recognized in a case where the background is black (K). For example, as shown in the viewpoint VP1 of FIG. 8, in a case where the background is white (W), the background reflects the V light, the B light, and the G light other than the R light toward the normal direction of the recording surface 22A. A part of the R light is reflected toward the normal direction, but the remaining R light is incident on the structural color ink 40 and remains inside. Therefore, the amount of reflected light is relatively small. Therefore, the V light, the B light, and the G light other than the R light are dominant in the amount of reflected light toward the eyes of the viewer 34 positioned at the viewpoint VP1, and the recognized color is cyan (C) which is a complementary color of red (R).

Further, as shown in FIG. 7, in a case where the background of the structural color ink 40 of the present example is black (K), the color to be recognized changes to the short wavelength side as the angle α of visual recognition increases. In a case where the background shown in FIG. 8 is white (W), a complementary color to the color recognized at each of the viewpoint VP2 and the viewpoint VP3 shown in FIG. 7 is recognized as in the viewpoint VP1. That is, a color recognized at the viewpoint VP2 at which the angle α of visual recognition is "45°" is magenta (M) which is a complementary color to green (G) recognized at the viewpoint VP2 in FIG. 7. A color recognized at the viewpoint VP3 at which the angle α of visual recognition is "60°" is yellow (Y) which is a complementary color of blue (B) recognized at the viewpoint VP3 in FIG. 7.

Figure 9:
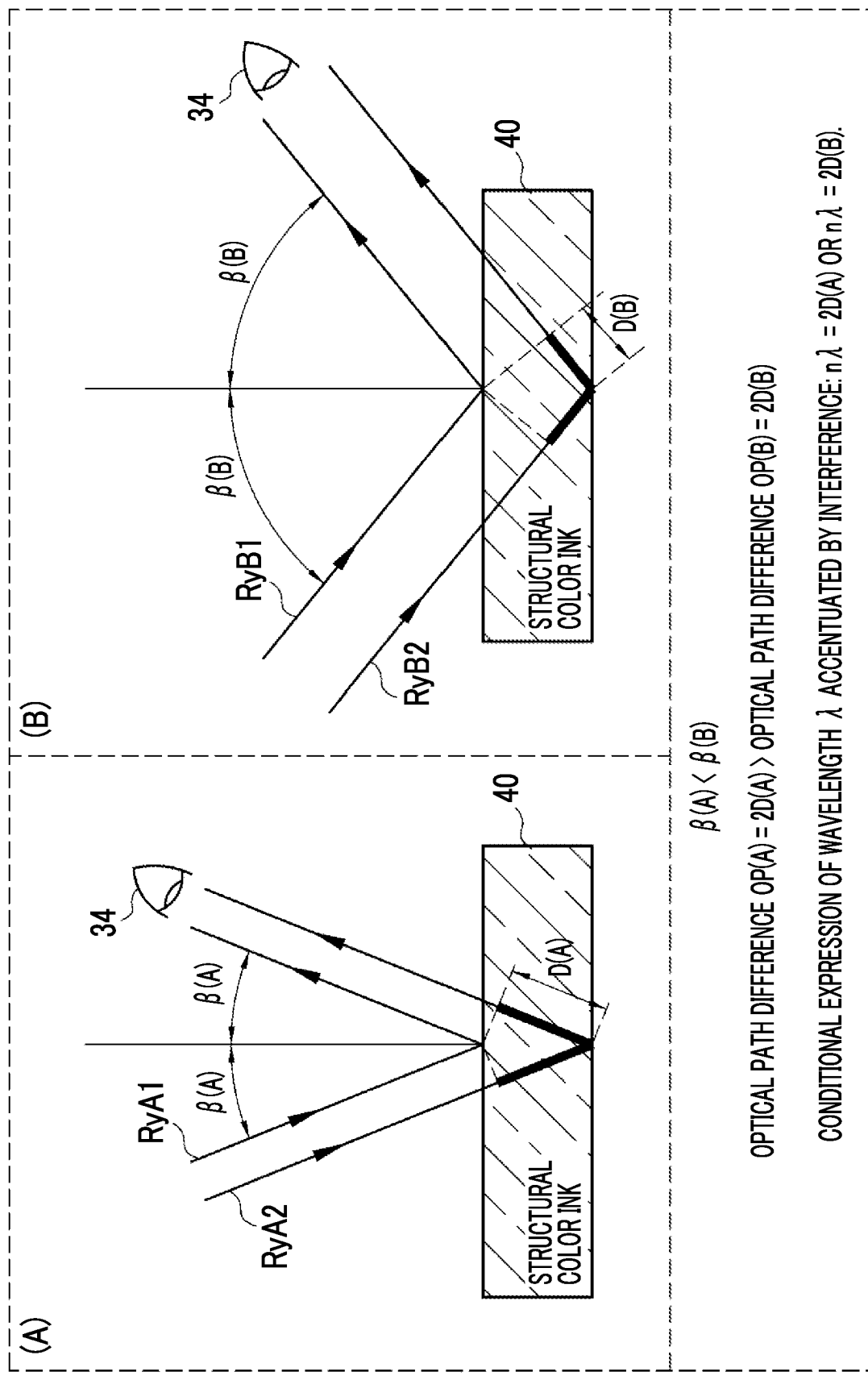
FIG. 9 is a view for describing a principle of change in color depending on the angle of visual recognition.

As shown in FIG. 9, the angle dependence of the color of the structural color ink 40 can be described by, for example, an optical path difference ΔOP of a ray Ry. Here, as shown in FIG. 9, the two rays Ry of the white light WL, which are incident on the structural color ink 40 at the same incidence angle β and are emitted from the structural color ink 40 at the same emission angle β as the incidence angle β by reflection, are considered. One of the two rays Ry is reflected at the interface on a front surface side of the structural color ink 40, and the other, once incident on the structural color ink 40, is reflected at the interface on a rear surface side of the structural color ink 40. In (A) of FIG. 9, the incidence angle and the emission angle are β(A), and the rays reflected at the interface on the front surface side of the structural color ink 40 are denoted by RyA1 and RyA2. In (B) of FIG. 9, the incidence angle and the emission angle are β(B), and the two rays Ry are denoted by RyB1 and RyB2, respectively.

In (A) of FIG. 9, the optical path difference ΔOP(A) of the ray RyA1 and the ray RyA2 is 2D(A). A conditional expression of a wavelength λ at which interference of light accentuates the two rays RyA1 and RyA2 is nλ=2D(A), where n is an integer of 1 or more. In a case where the wavelengths λ of the ray RyA1 and the ray RyA2 satisfy the conditional expression, the interference of light accentuates the wavelengths. The same applies to (B) of FIG. 9. The optical path difference ΔOP(B) between the ray RyB1 and the ray RyB2 is 2D(B). A conditional expression of the wavelength λ of light at which the interference of light accentuates the two rays RyB1 and RyB2 is nλ=2D(B). In a case where the wavelengths λ of the ray RyB1 and the ray RyB2 satisfy the conditional expression, the interference of light accentuates the wavelengths. The smaller β of the incidence angle and the emission angle is, the larger the optical path difference ΔOP is. In FIG. 9, there is a relationship of β(A)<β(B), and the optical path difference ΔOP (A) and the optical path difference ΔOP(B) have a relationship of OP(A)>OP(B). In such a manner, the smaller the optical path difference ΔOP between the two rays Ry is, the shorter the wavelength λ of light accentuated by the interference is. The optical path difference ΔOP decreases as β increases. β shown in FIG. 9 corresponds to the angle α of visual recognition shown in FIGS. 7 and 8. Therefore, the larger the angle α of visual recognition of the viewer 34 is, the smaller the wavelength λ of the light accentuated by the interference is. That is, as the angle α of visual recognition becomes larger, the more the color recognized by the viewer 34 changes to the short wavelength side.

As described above, the angle dependence of the color of the structural color ink 40 can be described by taking the interference of light as an example. FIG. 9 is a conceptual diagram, and refraction or the like at the interface of the structural color ink 40 is not shown.

In the printer 11 shown in FIG. 1, for example, three structural color inks 40 of blue (B), green (G), and red (R) are set as colors to be recognized in a case where the angle α of visual recognition is "0°". The printing is executed, for example, by associating the color of the BGR of the structural color ink 40 with a pixel value of each color of BGR in image data of the print image 21.

The operational terminal 12 shown in FIG. 1 has a function of displaying a preview of the print image 21 printed by the printer 11 using such a structural color ink 40.

Figure 10:
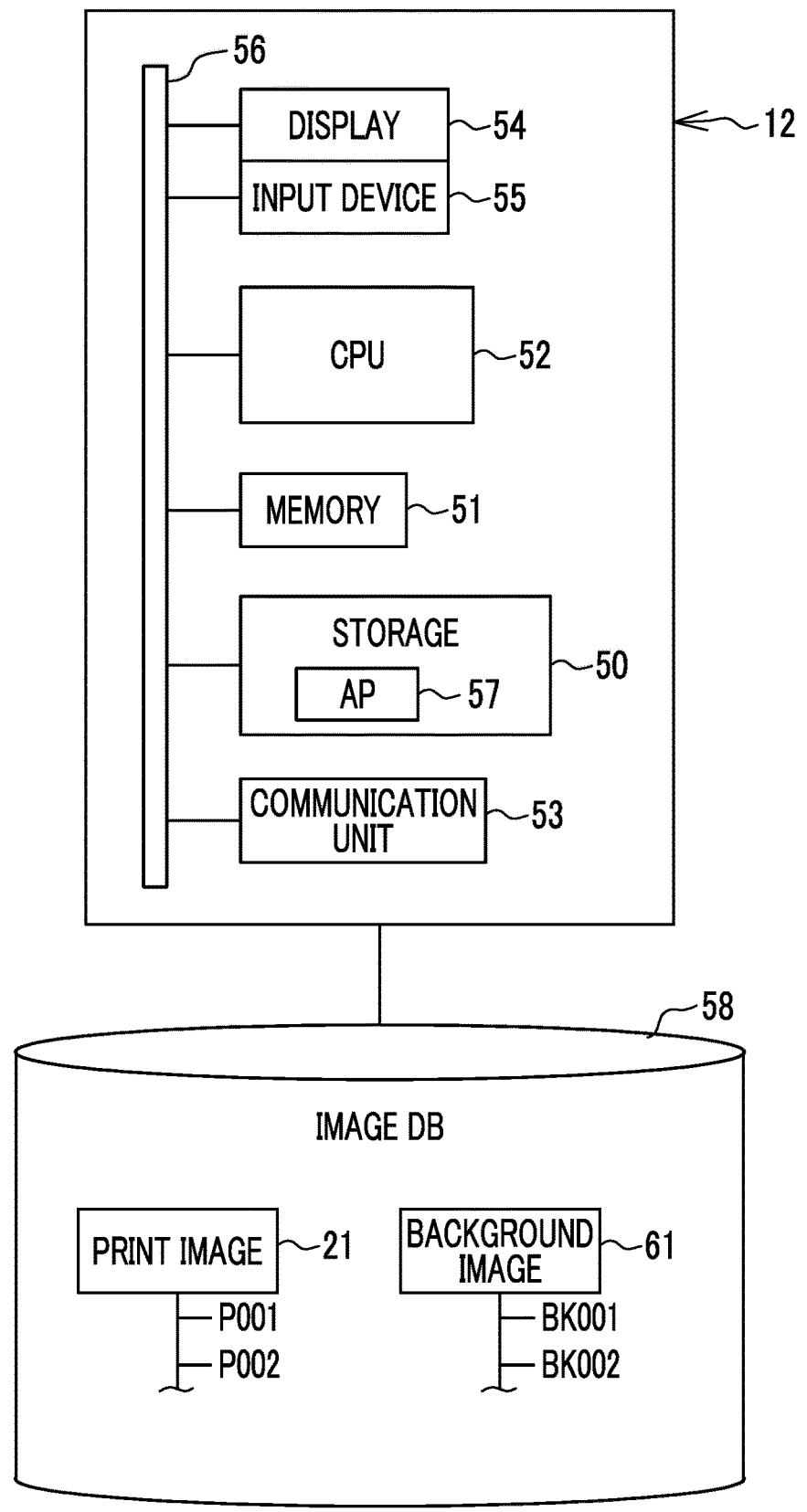
FIG. 10 is a hardware configuration diagram of the operational terminal.

As shown in FIG. 10 as an example, the operational terminal 12 is composed of a computer such as a personal computer, and includes a storage 50, a memory 51, a central processing unit (CPU) 52, a communication unit 53, a display 54, and an input device 55. These units are connected to each other through a bus line 56.

The storage 50 is built in the computer constituting the operational terminal 12 or is connected to the computer via a cable or a network. The storage 50 is composed of, for example, a hard disk drive or a solid-state drive. The storage 50 stores a control program, such as an operating system, various application programs 57 (hereinafter, referred to as AP), various types of data associated with these programs, and the like.

The memory 51 is a work memory used by the CPU 52 to execute processing. The CPU 52 loads the program stored in the storage 50 to the memory 51 and executes processing corresponding to the program. Therefore, the CPU 52 controls the overall operation of each unit of the computer. In addition, the memory 51 may be built in the CPU 52.

The communication unit 53 controls transmission of various types of information to the printer 11, an external storage, and the like. The display 54 displays various screens in addition to the display screen 26. The various screens have operation functions through a graphical user interface (GUI). The computer constituting the operational terminal 12 receives operation instructions input from the input device 55 through various screens. The input device 55 is, for example, a keyboard, a mouse, a touch panel, and a microphone for voice input.

The AP 57 is, for example, an operation program for causing the computer to function as the operational terminal 12. The AP 57 is an example of a "program for operating the display control device" according to the technique of the present disclosure. In the operational terminal 12, in a case where the AP 57 is activated, the CPU 52 functions as a processor 60 shown in FIG. 11 in cooperation with the memory 51 and the like.

An image database (hereinafter, simply referred to as DB) 58 stores a background image 61 used as the background of the print image 21, and the like, in addition to the print image 21 printed by the printer 11. The background image 61 is an example of a "background" according to the technique of the present disclosure. As described above, the background is a base of the print image 21, and includes the recording surface 22A of the recording medium 22 and the like in addition to the background image 61. The operational terminal 12 is able to communicate with the image DB 58 through the communication unit 53, and acquires the print image 21 and the background image 61 from the image DB 58. The background image 61 may be an image registered in advance by a manufacturer or may be an image registered in advance by a user. The background image 61 registered in advance is an example of a "registered background" according to the technique of the present disclosure. Further, the background that is not stored in the image DB 58 and that is optionally input by the user may be used.

Figure 11:
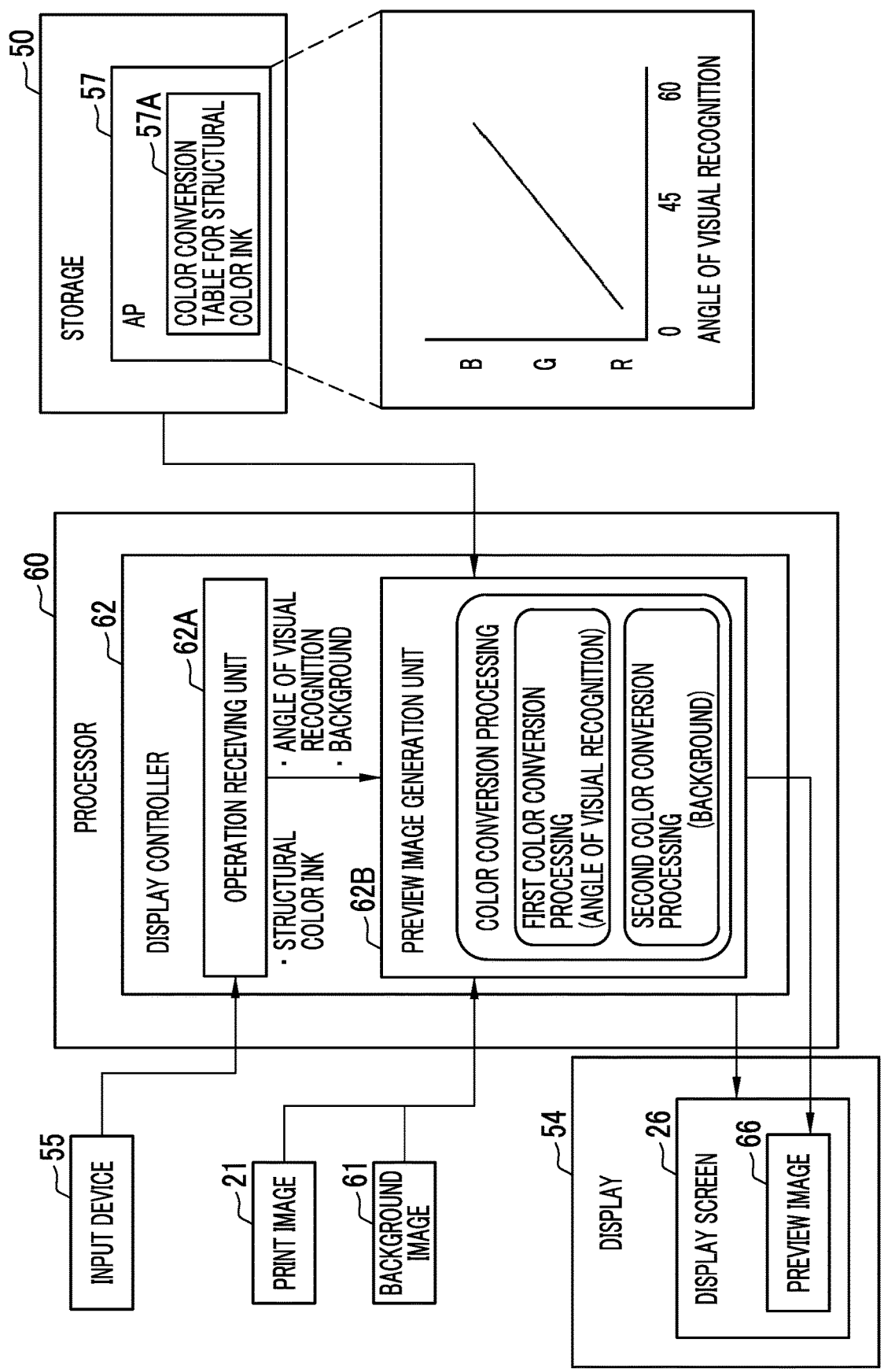
FIG. 11 is a functional block diagram of the operational terminal.

As shown in FIG. 11, the processor 60 functions as a display controller 62. The display controller 62 includes an operation receiving unit 62A and a preview image generation unit 62B. The preview image generation unit 62B generates a preview image 66 for previewing the print image 21 before the printer 11 prints the print image 21. The operation receiving unit 62A receives an operation instruction which is input through the input device 55. The operation instruction includes designation of a condition for generating the preview image 66, such as designation of the print image 21, designation of the angle α of visual recognition, and designation of the background.

The preview image generation unit 62B acquires the print image 21 from the image DB 58 on the basis of the operation instruction which is received by the operation receiving unit 62A. Then, the preview image generation unit 62B generates the preview image 66 in which the print image 21 and the background are superimposed. Specifically, the preview image generation unit 62B generates the preview image 66 corresponding to pixel values of respective colors of BGR of the image data of the print image 21 and to pixel values of BGR of the image data of the background. The preview image generation unit 62B executes color conversion processing including first color conversion processing and second color conversion processing. The first color conversion processing is color conversion processing in which the angle dependence relating to the angle α of visual recognition for the color of the structural color ink 40 is considered. The second color conversion processing is color conversion processing in which the background dependence of the color of the structural color ink 40 is considered.

For example, the AP 57 has a color conversion table 57A for the structural color ink (hereinafter, simply referred to as a color conversion table). The color conversion table 57A is a table that defines a correspondence relationship between the angle α of visual recognition and the color of the structural color ink 40. In a case where the first color conversion processing is executed, the preview image generation unit 62B determines a color corresponding to the angle α of visual recognition by referring to the color conversion table 57A on the basis of the angle α of visual recognition which is designated by the operation instruction. The color conversion table 57A shown in FIG. 11 is an example of a table that defines a relationship in which the color changes to the short wavelength side as the angle α of visual recognition increases, as shown in FIG. 7. The color conversion table 57A may be defined by a function instead of the table format.

Further, the preview image generation unit 62B performs color conversion processing (hereinafter, referred to as the second color conversion processing) in consideration of the combination with the background color of the print image 21, such as the color of the recording surface 22A of the recording medium 22 and the image data of the background image 61. In the second conversion processing, color conversion according to a color of the background as shown in FIGS. 5 to 8 is performed on the image data of the print image 21.

The display controller 62 outputs the display screen 26, on which the generated preview image 66 is displayed, to the display 54.

Figure 12:
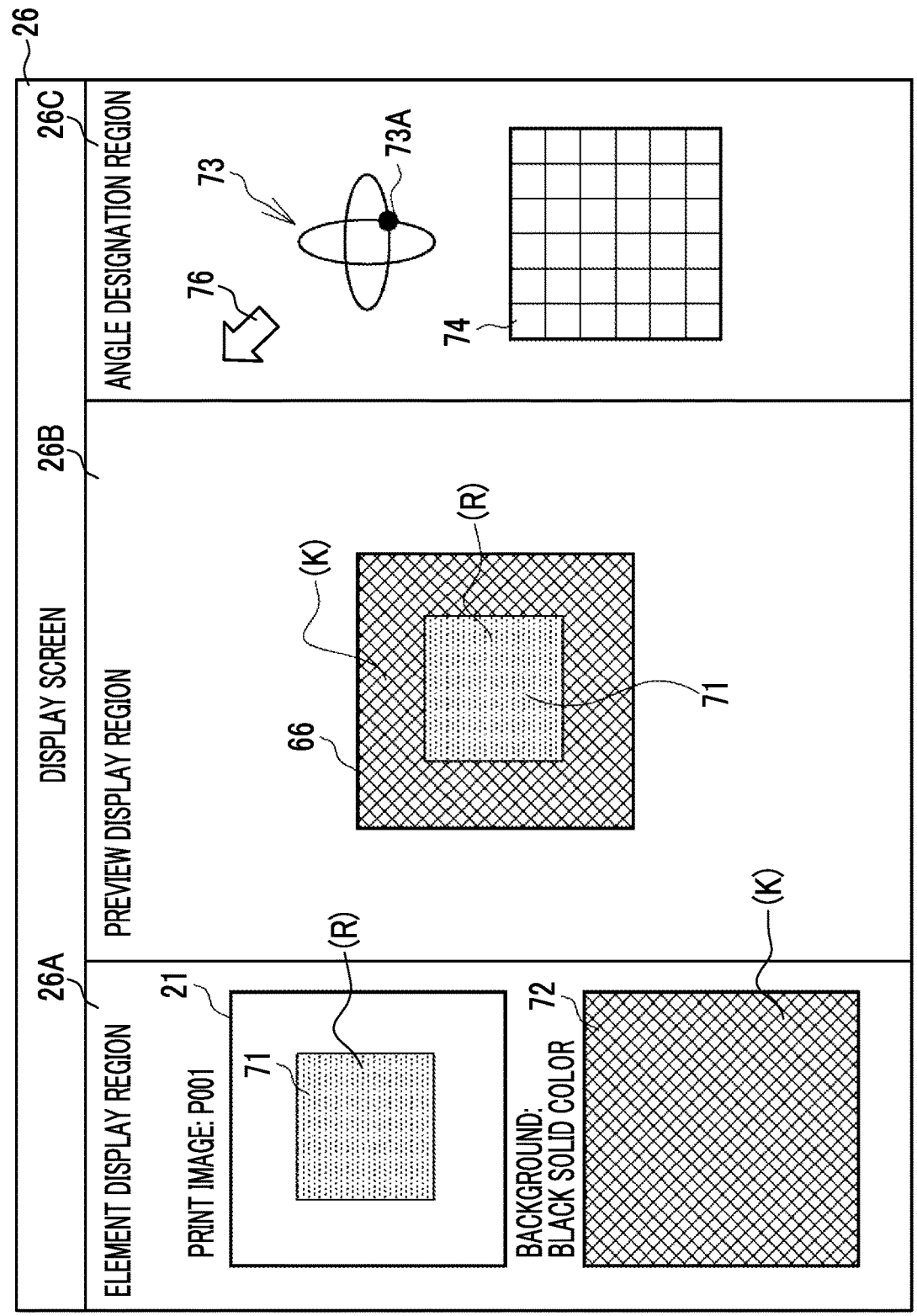
FIG. 12 is a diagram showing a display screen of a preview image.
Figure 13:
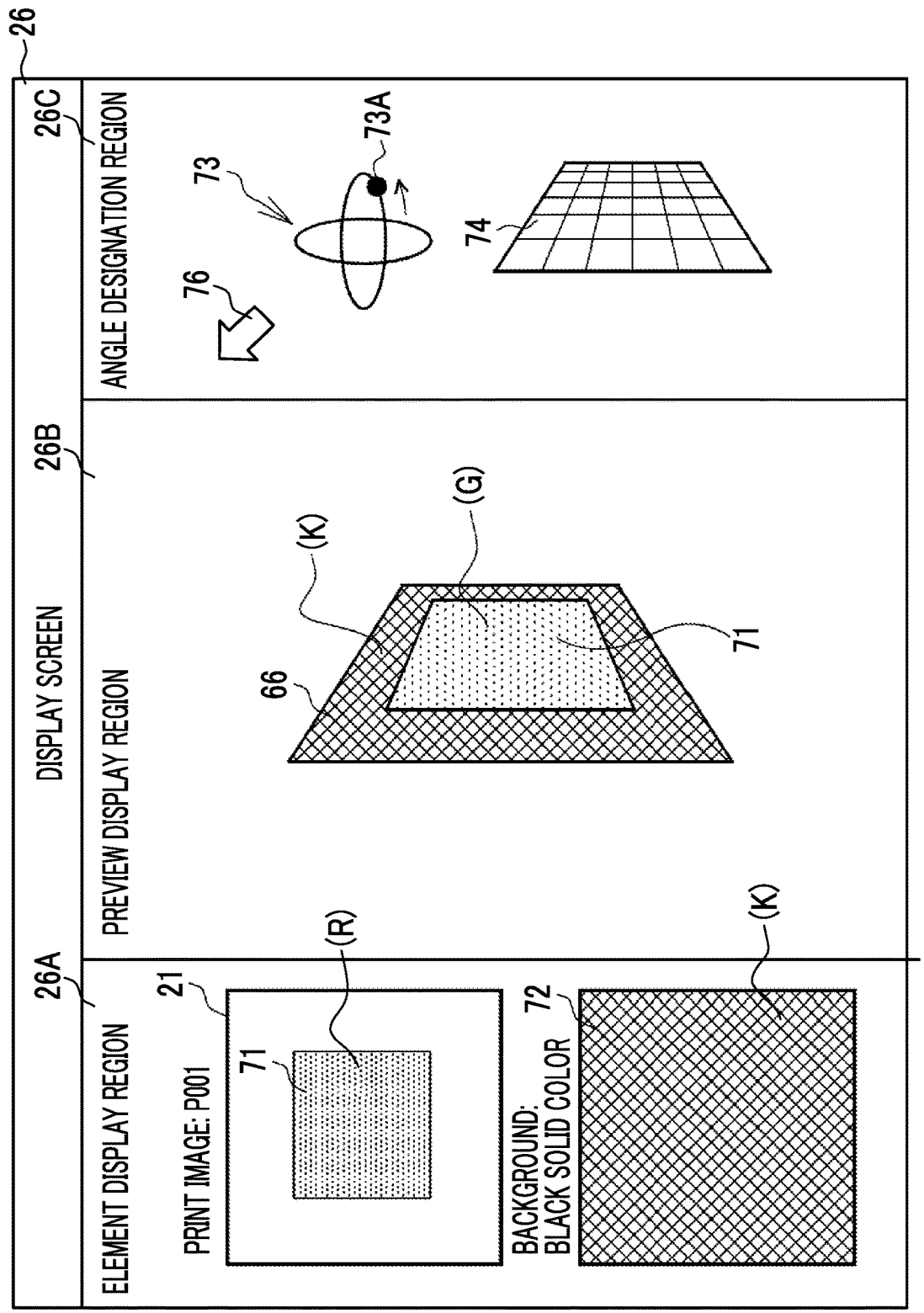
FIG. 13 is a diagram showing the display screen of the preview image in a case where the angle of visual recognition is changed.
Figure 14:
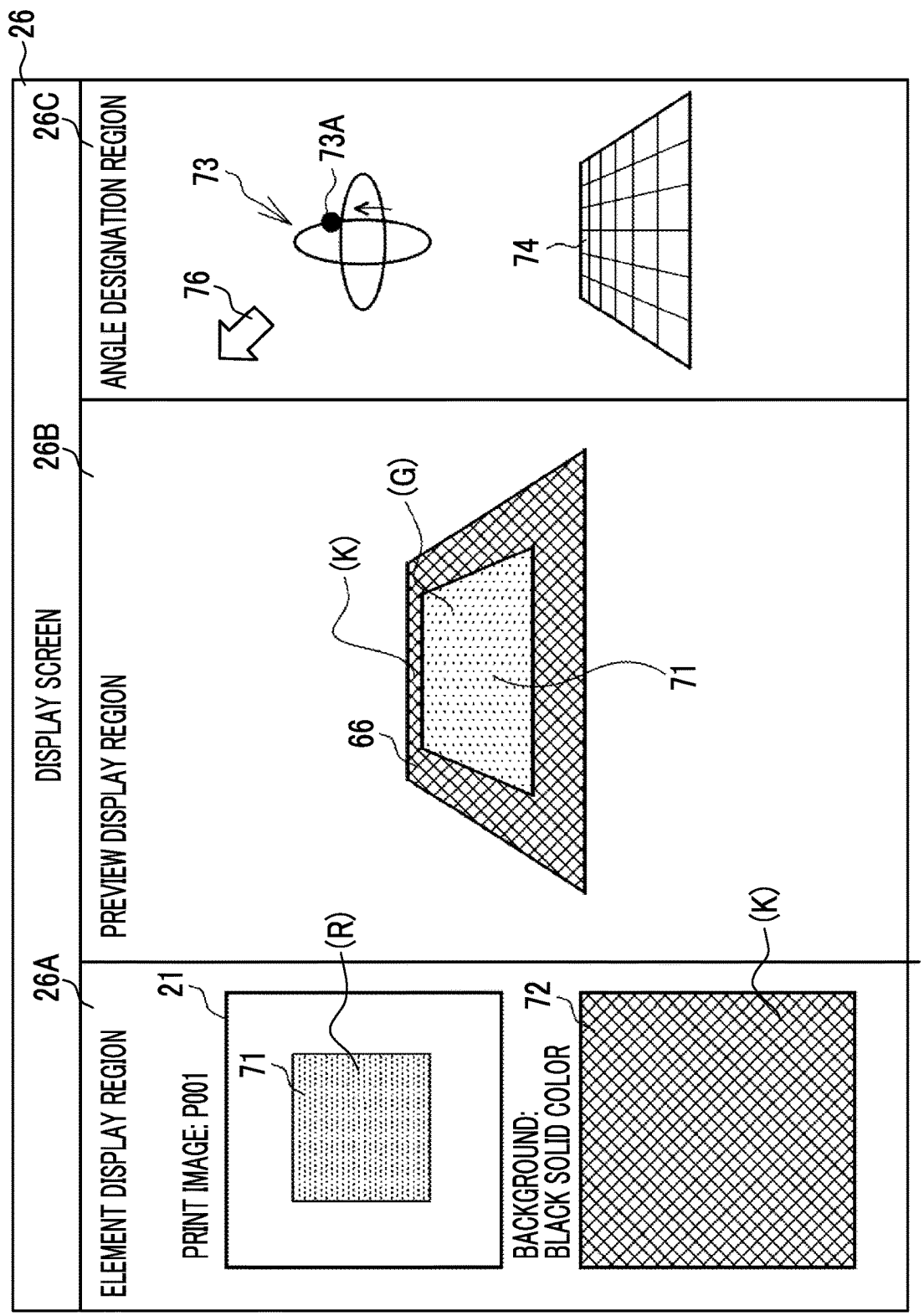
FIG. 14 is a diagram showing a display screen of a preview image in a case where an angle of visual recognition is changed in a direction different from that of FIG. 13.

FIGS. 12 to 14 each show an example of the display screen 26 on which the preview image 66 is displayed. The display screen 26 has an element display region 26A, a preview display region 26B, and an angle designation region 26C. The element display region 26A is a region in which the print image 21 and a background 72, which are elements in a case where the preview image 66 is generated, are displayed. In FIGS. 12 to 14, an image in which a quadrangular FIG. 71 is drawn in the center is displayed as the print image 21. The inside of the FIG. 71 is only red (R). Further, in FIGS. 12 to 14, "black solid color" is designated as the background 72. The black solid color is designated, for example, in a case where the recording medium 22(K) of which the recording surface 22A shown in FIG. 5, FIG. 7, and the like is black (K) is used.

The preview display region 26B is a region in which the preview image 66 is displayed. On the display screen 26, the background 72 which is not combined with the print image 21 is displayed in the element display region 26A, and the preview image 66 in which the print image 21 and the background 72 are superimposed is displayed in the preview display region 26B. In such a manner, each of the preview image 66 and the background 72, which is not combined with the print image 21, are displayed on the display screen 26.

Further, precisely, the print image 21 displayed in the element display region 26A is an image before the color is changed by the designated background 72. Since the background 72 has an influence on the color of the preview image 66, it is possible to check the print image 21 in an original state before the color is changed depending on the background 72, in the element display region 26A. In the print image 21 shown in FIG. 12, only the quadrangular FIG. 71 is drawn in the center thereof, the periphery thereof is blank, and nothing is drawn. As shown in the preview image 66, in the print image 21 combined with the background 72, the background 72 has an influence on the entire region including the FIG. 71 and a blank part, and the color changes from the original state.

The angle designation region 26C is a region that receives the designation of the angle α of visual recognition. The angle designation region 26C is provided with a first designation tool 73 and a second designation tool 74 for designating an angle. Each of the first designation tool 73 and the second designation tool 74 is an object as a component of a GUI. The second designation tool 74 is an example of the "object" or an "object different from the preview image" according to the technique of the present disclosure.

The first designation tool 73 has a form in which a vertically long ellipse and a laterally long ellipse are combined, and has a spherical slider 73A that can be moved on each ellipse. The angle α of visual recognition is designated by operating the slider 73A with a pointer 76 such as a mouse. Further, the first designation tool 73 is a tool for designating the angle α of visual recognition, and also functions as an indicator that displays the angle α designated by a position of the slider 73A. Further, the second designation tool 74 is a quadrangular object, and a posture thereof can be changed by the pointer 76. By changing the posture of the second designation tool 74, the angle α of visual recognition is designated. The second designation tool 74 also functions as an indicator that displays the angle α designated by the posture thereof, similarly to the first designation tool 73. In the second designation tool 74, a lattice, in which vertical lines and horizontal lines intersect each other, is displayed inside a quadrangle, and an angle of the lattice changes in accordance with a change in posture as shown in FIGS. 13 and 14.

The operation receiving unit 62A receives the designation of the angle α of visual recognition through the first designation tool 73 and the second designation tool 74. The preview image generation unit 62B changes the posture of the preview image 66 in addition to changing the color of the preview image 66, in accordance with the designated angle α.

In FIG. 12, the angle α of visual recognition is designated as "0°", and FIG. 12 shows the preview image 66 at the viewpoint VP1 in FIG. 7 or the like, that is, the preview image 66 in a case where the print image 21 is visually recognized from the front. In contrast, FIG. 13 shows the preview image 66 in a case where the angle α of visual recognition is designated as "45°" and the print image 21 is visually recognized at the viewpoint VP2 shown in FIG. 7 or the like. Further, the color of the FIG. 71 of the preview image 66 is red (R), which is the original color of the print image 21, as viewed from a front as shown in FIG. 12, but the color of the FIG. 71 changes to green (G) in the preview image 66 shown in FIG. 13. In the preview image 66, the color corresponding to the optical characteristic of the structural color ink 40, such as the angle dependence and the background dependence, is reproduced.

As described above, in a case where the print image 21 printed using the structural color ink 40 is visually recognized at different angles (angles α of visual recognition in the present example), the processor 60 displays a plurality of preview images 66 corresponding to the angles (the angles α of visual recognition in the present example).

In FIG. 14, the angle α of visual recognition is designated as "45°" similarly to FIG. 13, but unlike the preview image 66 of FIG. 13 which is rotated about a vertical axis, the preview image 66 rotated about a horizontal axis orthogonal to the vertical axis is displayed.

Figure 15:
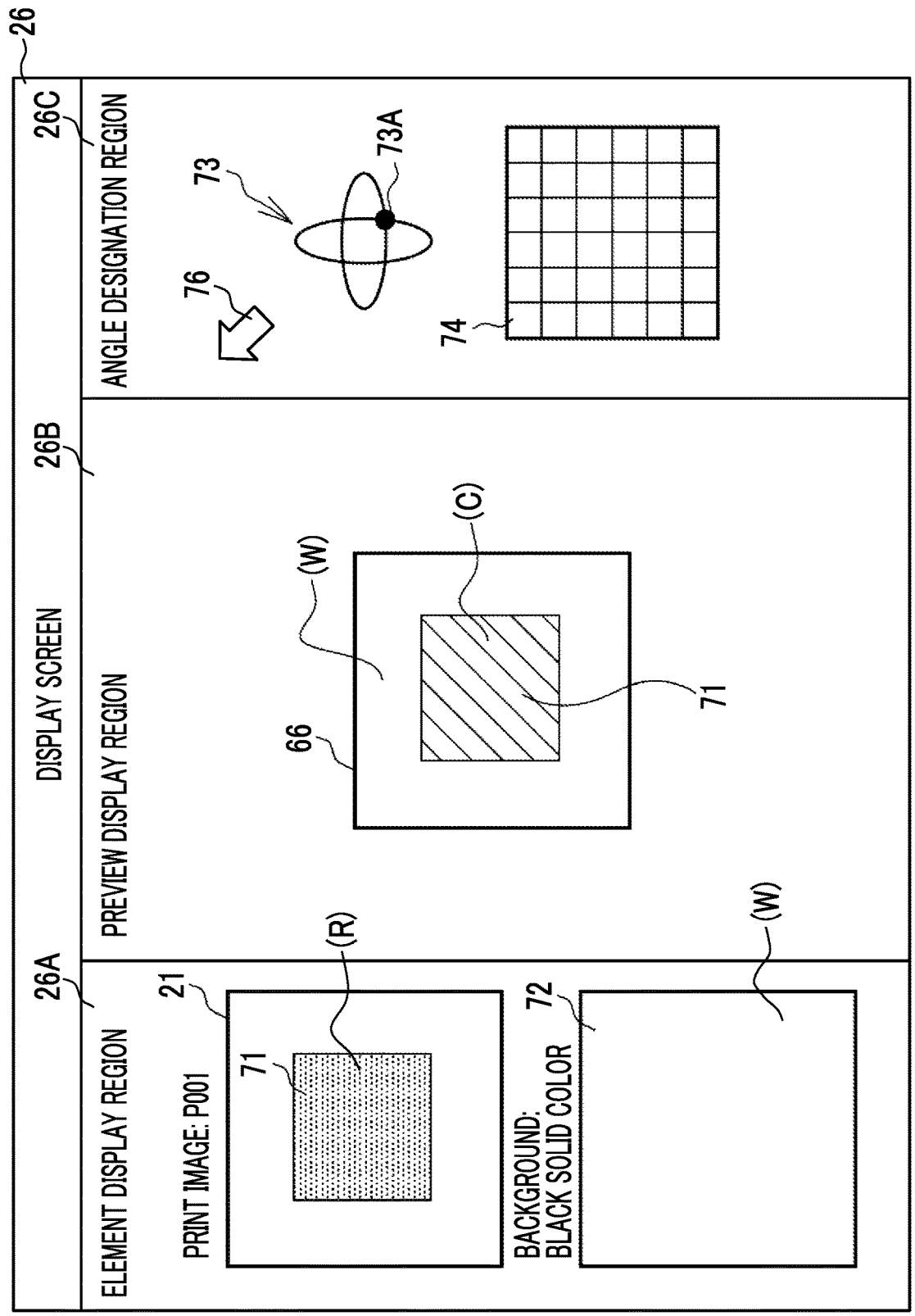
FIG. 15 is a diagram showing a display screen of a preview image in a case where the background is white.
Figure 16:
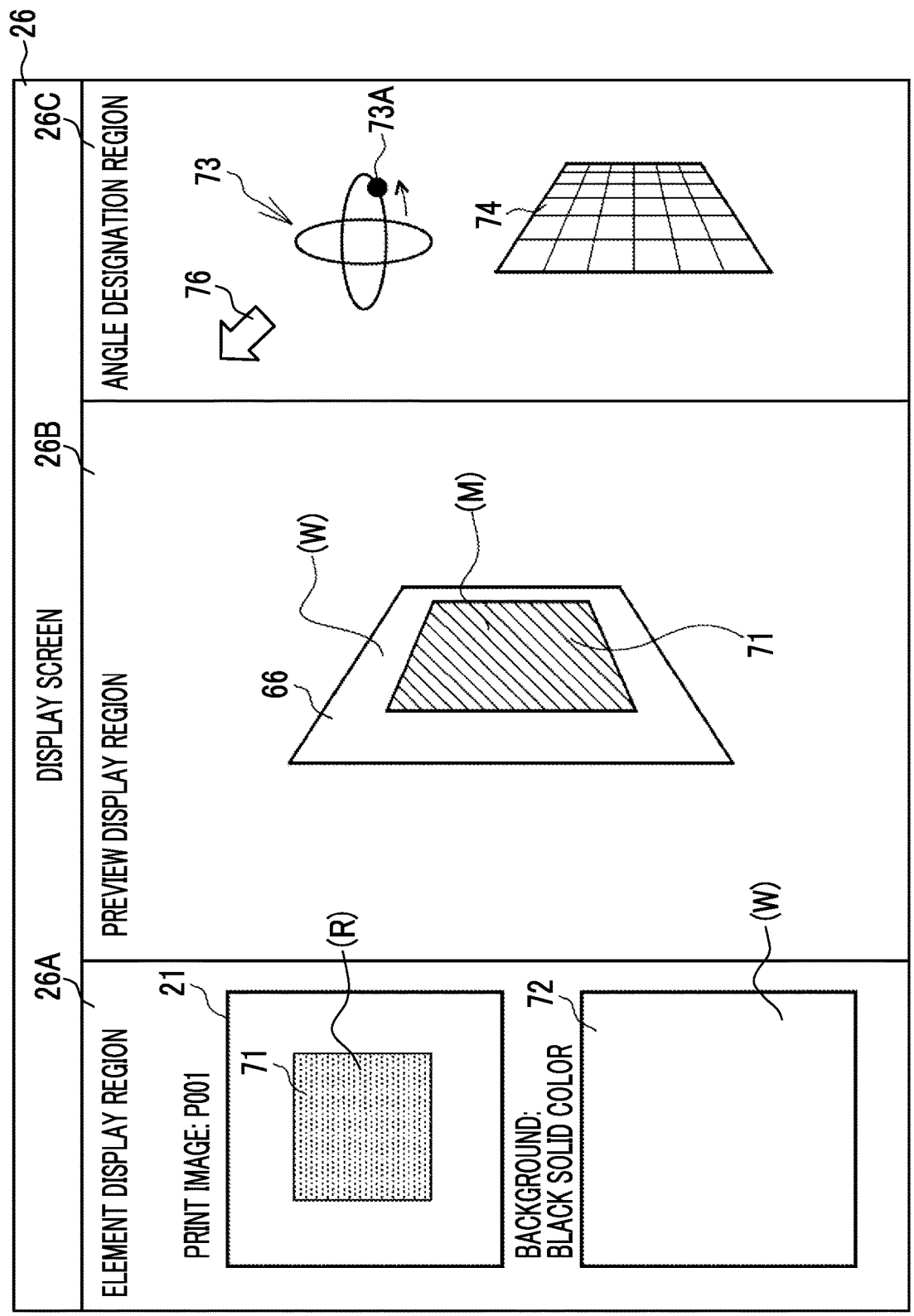
FIG. 16 is a diagram of a display screen of a preview image in a case where the background is white and in a case where the angle of visual recognition is changed.

The display screen 26 shown in FIGS. 15 and 16 is an example in which "white solid color" is designated as the background 72. The white solid color is designated, for example, in a case where the recording medium 22(W) of which the recording surface 22A shown in FIGS. 6 and 8 and the like is white (W) is used. The print image 21 is an image in which the quadrangular FIG. 71 having the color of red (R) is drawn in the center, similarly to the examples shown in FIGS. 12 to 14.

Similarly to FIG. 12, FIG. 15 shows an example in which the preview image 66 in a case where the designation of the angle α of visual recognition is "0°" and the print image 21 is visually recognized from the front is displayed. In FIG. 16, similarly to FIG. 13, the preview image 66 in a case where the designation of the angle α of visual recognition is "45°" is displayed. Although the color of the FIG. 71 of the print image 21 is red (R), in the example of FIG. 15, since the background is white (W), the color of the FIG. 71 of the preview image 66 is cyan (C) which is a complementary color of red (R). Further, as shown in FIG. 16, in a case where the angle α of visual recognition changes from "0°" to "45°", the color of the FIG. 71 of the preview image 66 changes from cyan (C) to magenta (M), as shown in FIG. 8.

Figure 17:
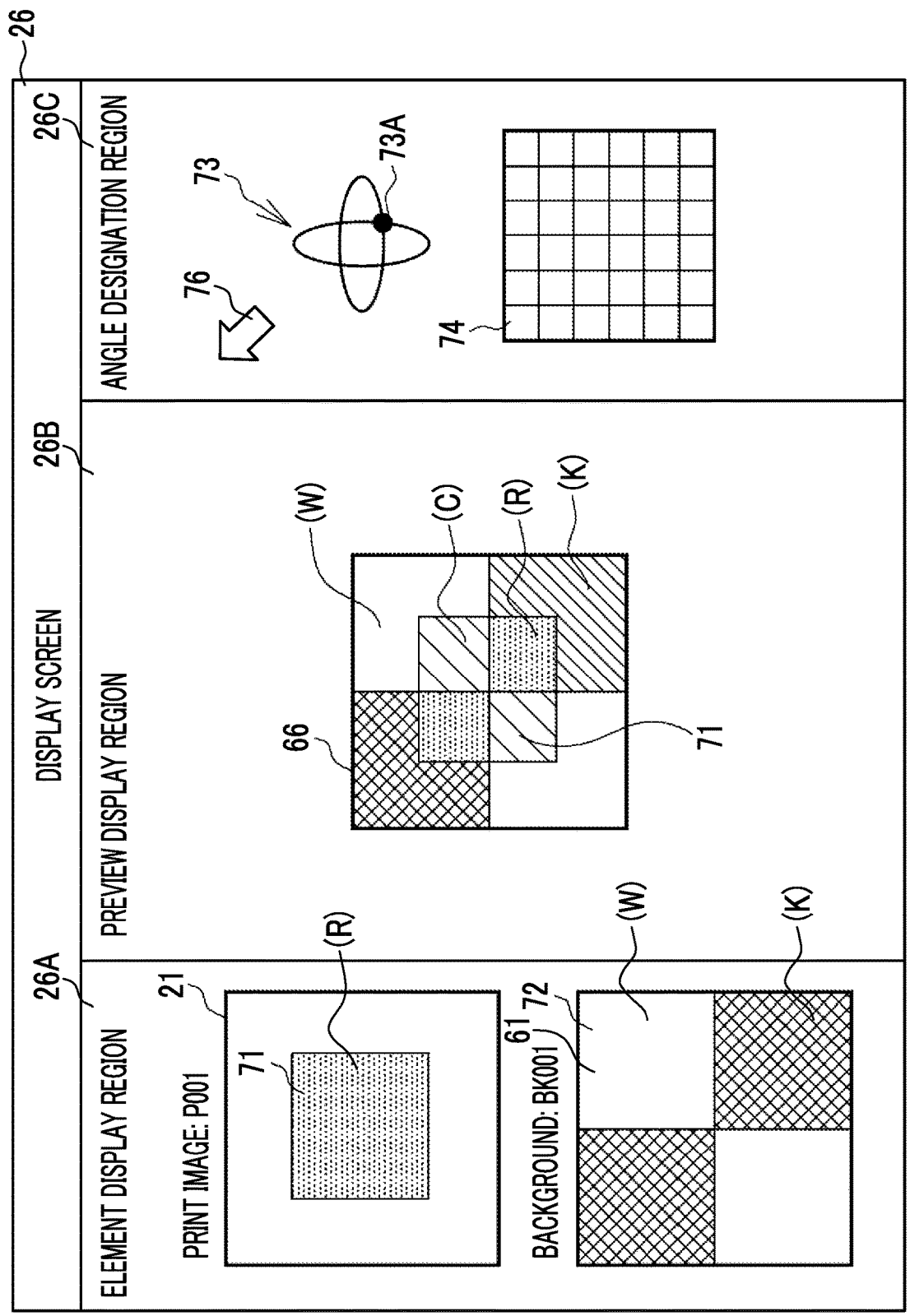
FIG. 17 is a diagram showing a preview image in a case where a background including regions of different colors is used.

As shown in FIG. 17, as the background 72, the background image 61 may be used in addition to the color of the recording surface 22A such as the black solid color or the white solid color. The background image 61 shown in FIG. 17 is an image representing a design in which the screen is divided into four regions and two groups of division regions disposed diagonally are filled with black (K) and white (W), respectively. In such a case, even in the print image 21 on which the quadrangular FIG. 71 having the color of red (R) shown in FIGS. 12 to 16 is drawn, the color of the FIG. 71 is different for each of the regions of black (K) and white (W). As shown in the preview image 66 of FIG. 17, a part in which the FIG. 71 and the black (K) region of the background image 61 overlap each other is red (R), and a part in which the FIG. 71 and the white (W) region of the background image 61 overlap each other is cyan (C) which is a complementary color to red (R). As described above, the preview image 66 is subjected to the color conversion according to the color of the background 72.

Figure 18:
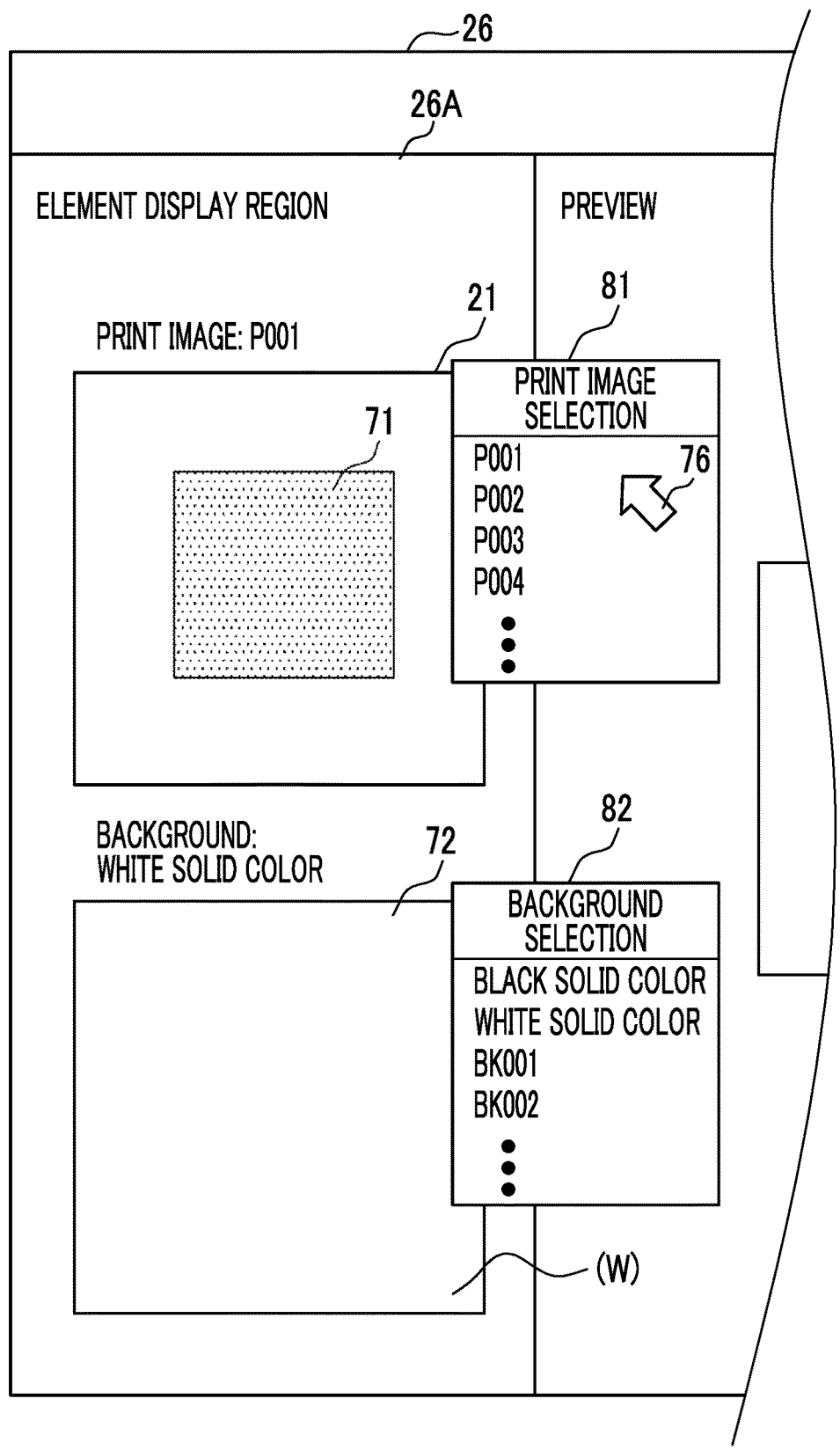
FIG. 18 is a diagram showing a selection screen of the print image and the background.

As shown in FIG. 18, a selection screen 81 for designating the print image 21 and a selection screen 82 for designating the background 72 are displayed on the display screen 26. A list of the plurality of print images 21, which are stored in the image DB 58 and which can be designated, is displayed on the selection screen 81. A list of the plurality of backgrounds 72, which are stored in the image DB 58 and which can be designated, is displayed on the selection screen 82. Each of the selection screen 81 and the selection screen 82 is displayed in a pop-up manner through, for example, an operation of clicking a region of the print image 21 or of the background 72 with the pointer 76. Then, the print image 21 or the background 72 is designated by an operation of selecting the print image 21 or the background 72 from the list of the selection screen 81 or of the selection screen 82 using the pointer 76. The operation receiving unit 62A receives the designation of the print image 21 or of the background 72 through such a selection operation. The selection screen 82 is an example of a region for receiving the designation of the background 72.

Figure 19:
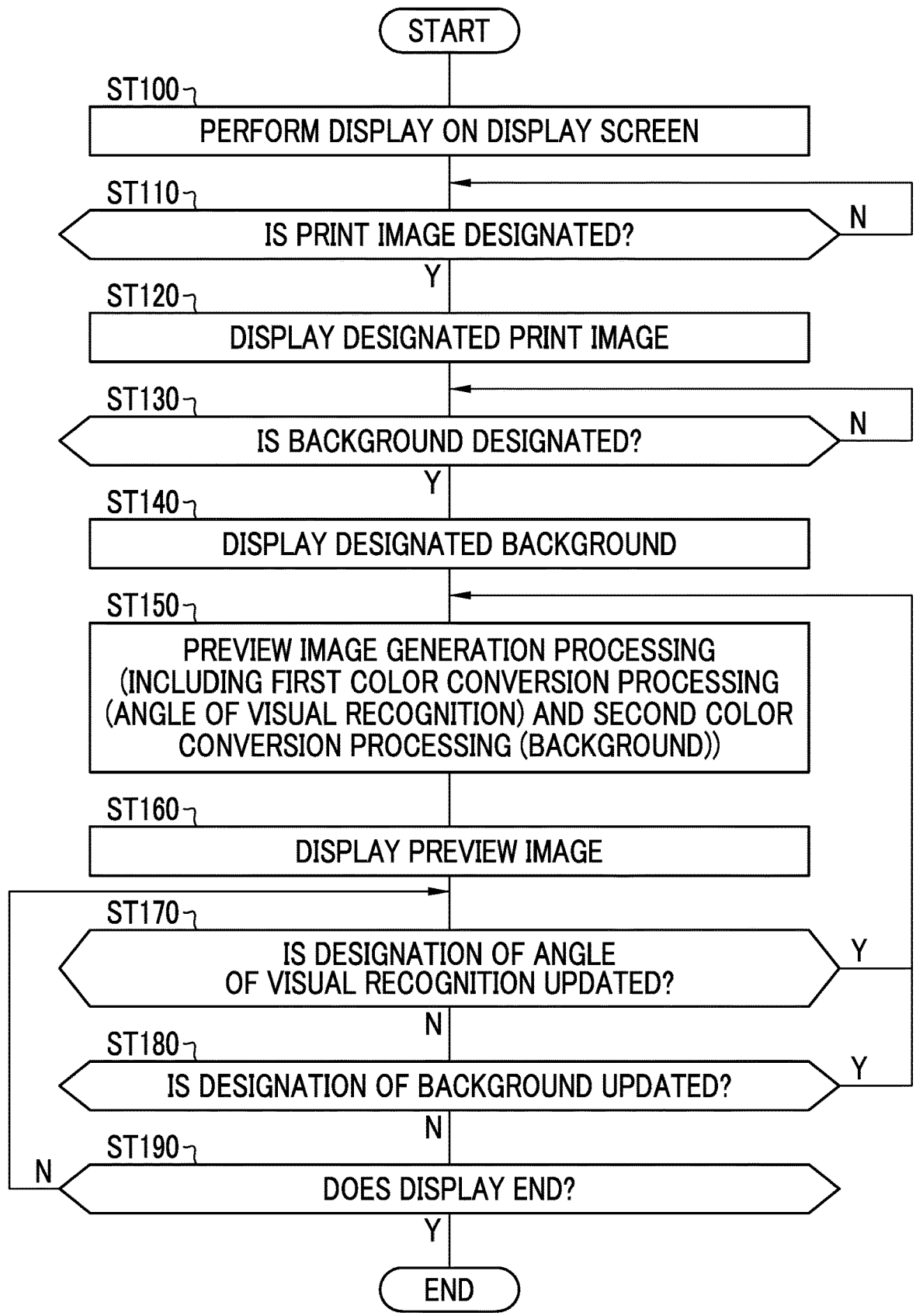
FIG. 19 is a flowchart showing an operation procedure of the operational terminal.

The operation of the above-mentioned configuration will be described with reference to FIG. 19. In a case where the operational terminal 12 is started and the start-up instruction of the display screen 26 is input, the processor 60 displays the display screen 26 on the display 54 (step ST100). In step ST110, the processor 60 waits for the designation of the print image 21 (N in step ST110). In a case where the designation of the print image 21 is received through the operation of the user (Y in Step ST110), the processor 60 displays the designated print image 21 in the element display region 26A of the display screen 26 (Step ST120). In step ST130, the processor 60 waits for the designation of the background 72 (N in step ST130). In a case where the designation of the background 72 is received through the operation of the user (Y in Step ST130), the processor 60 displays the designated background 72 in the element display region 26A of the display screen 26 (Step ST140). In a case where the print image 21 and the background 72 are designated, the processing proceeds to Step ST150.

In step ST150, the processor 60 executes the preview image generation processing. In the preview image generation processing, the first color conversion processing corresponding to the angle α of visual recognition and the second color conversion processing corresponding to the color of the designated background 72 are executed. The angle α of visual recognition is set to "0°" in the initial setting. The processor 60 displays the generated preview image 66. In a case where the print image 21 shown in FIG. 12 and the black solid color background 72 are designated, the preview image 66 shown in FIG. 12 is displayed (step ST160).

In step ST170, in a case where the designation of the angle α of visual recognition is updated by performing the operation of changing the angle α of visual recognition through the angle designation region 26C (Y in step ST170), the processor 60 returns to step ST150, and then regenerates the preview image 66. Then, the regenerated preview image 66 is displayed (step ST160). In such a manner, the preview image 66 is also updated in accordance with the update of the designation of the angle α of visual recognition.

In step ST180, in a case where the designation of the background 72 is updated by performing the operation of changing the background 72 through the selection screen 82 (Y in step ST180), the processing returns to step ST150, then the preview image 66 is regenerated, and the regenerated preview image 66 is displayed (step ST160). In such a manner, the preview image 66 is also updated in accordance with the update of the designation of the background 72.

In step ST190, the processor 60 continues the display of the preview image 66 until an instruction to end the display of the display screen 26 is issued.

In addition, as a matter of course, in a case where the print image 21 is changed, the processor 60 executes the preview image generation processing and the like from Step ST150.

As described above, in the display control device according to the technique of the present disclosure, which shows the operational terminal 12 as an example, in a case where the print image 21 printed using the structural color ink 40 is visually recognized at different angles (angles α of visual recognition in the present example), the processor 60 displays, on the display screen 26, the plurality of preview images 66 corresponding to the angles (the angles α of visual recognition in the present example). The color of the structural color ink 40 changes depending on the angle α of visual recognition. Therefore, according to the technique of the present disclosure, it is possible to check, before printing, the change in color due to the angle α of visual recognition of the print image 21 printed with the structural color ink 40.

The technique of the present disclosure has a configuration in which first color conversion processing corresponding to the angle α of visual recognition is performed on the premise of the color development principle of the structural color ink 40 different from the normal ink 30, in the preview image generation processing. Thus, the configuration is clearly different from that of a device simply switching images as in the related art, such as displaying a preview image of a lenticular sheet. Further, the structural color ink 40 differs from the normal ink 30 in the color development principle. Thus, the method of changing the color depending on the angle α of visual recognition is significantly different. As a result, there is also a great need to present a user with the preview image 66 in which such change in color is reproduced.

Further, since the processor 60 receives the designation of the angle α of visual recognition, the user is able to check the change in color of the preview image 66 according to any angle of visual recognition.

Further, the processor 60 displays, on the display screen 26, an object (as an example, the second designation tool 74) of which the posture can be changed through the operation of the user, and receives designation of the angle α of visual recognition in accordance with the posture of the object. Therefore, the user is able to perform the designation of the angle α of visual recognition through an intuitive operation.

In the above-mentioned example, the first designation tool 73 and the second designation tool 74 are exemplified as a tool for designating the angle α of visual recognition. However, the preview image 66 may be used as the same tool as the second designation tool 74. That is, for example, the preview image 66 is made to function as the object of which the posture is changed through the operation which is performed by the user with the pointer 76. The processor 60 receives the designation of the angle α of visual recognition through the operation of changing the posture of the preview image 66. In such a manner, a more intuitive operation can be performed.

In a case where the preview image 66 is made to function as a tool for designating the angle α of visual recognition for the preview image 66, at least one of the first designation tool 73 or the second designation tool 74 does not have to be provided. It should be noted that providing the first designation tool 73 and the second designation tool 74 as an object different from the preview image 66 has the following advantages. For example, in some cases, a shape of the preview image 66 viewed from a front may not be a simple rectangular shape and may be a shape such as a trapezoidal shape or an elliptical shape. In such a case, it is assumed that it may be difficult for the user to check whether or not the posture is changed only on the basis of the preview image 66, and it may be difficult for the user to determine whether the angle α of visual recognition is appropriately designated. In such a case, in a case where at least one of the first designation tool 73 or the second designation tool 74 is provided, the first designation tool 73 or the second designation tool 74 also functions as an indicator for the posture change. Therefore, the user is able to easily determine whether the angle α of visual recognition is appropriately designated.

Further, in the display control device according to the technique of the present disclosure showing the operational terminal 12 as an example, the processor 60 displays the preview image 66, in which the background 72 and the print image 21 printed using the structural color ink 40 are superimposed, on the display screen 26. The color of the structural color ink 40 changes depending on the background 72. Therefore, according to the technique of the present disclosure, it is possible to check, before printing, change in appearance caused by a combination of the background 72 and the print image 21 printed with the structural color ink 40.

The technique of the present disclosure has a configuration in which the second color conversion processing corresponding to the color of the background 72 is performed on the premise of the color development principle of the structural color ink 40 different from the normal ink 30, in the preview image generation processing. Thus, the configuration is clearly different from that of a device simply switching images as in the related art, such as displaying a preview image of a lenticular sheet. Further, the structural color ink 40 differs from the normal ink 30 in the color development principle. Thus, the method of changing the color depending on the background 72 is significantly different. As a result, there is also a great need to present a user with the preview image 66 in which such change in color is reproduced.

Further, the processor 60 receives the designation of the background 72. Thus, it is possible to check the change in the appearance including the color of the preview image 66 according to the designated background 72.

Further, the processor 60 receives the designation of the background through the operation of the user. Thus, it is possible to check the change in the appearance including the color of the preview image 66 according to the background 72 designated by the user.

Further, the designation of the background 72 is received by selecting from a plurality of registered backgrounds registered in advance or by inputting any background. Therefore, a degree of freedom in a case where the user selects the background is high.

Further, the preview image 66, in which the print image 21 and the background 72 are superimposed, and the background 72, which is not combined with the print image 21, are displayed on the display screen 26. Therefore, it is possible to check both the preview image 66 and the background 72 while comparing the preview image 66 and the background 72.

Further, the preview image 66, in which the print image 21 and the background 72 are superimposed, and the print image 21 before change in color depending on the background 72 are each displayed on the display screen 26. Therefore, it is possible to check both the preview image 66, in which the color is changed depending on the background 72, and the print image 21 before the change in color depending on the background 72 while comparing the preview image 66 and the print image 21.

The display screen 26 is provided with a region in which the designation of the background 72 is received, similarly to the selection screen 82 shown as an example. Therefore, it is possible to receive the designation of the background 72 with an intuitive operation using the GUI.

Modification Examples

Various modification examples will be described with reference to FIGS. 20 to 25. As shown in FIG. 20, the print image 21 may include, in addition to the FIG. 71, any one of text as shown in "LOGO" as an example, a design as shown by a wavy line as an example, and a pattern or a photo as shown by a butterfly as an example. In particular, in a case where an image of an organism or an object having wings such as the structure 41 shown in FIG. 4 is used as the print image 21, it is also possible to reproduce change in color of the actual structure 41 due to the effect of the structural color ink 40. Further, it is possible to use an image such as text, a figure, a pattern, a design, and a photo not only for the print image 21 but also for the background 72.

The above-mentioned example has described the example in which the plurality of preview images 66 corresponding to the angles α of visual recognition are selectively displayed as shown in FIGS. 12 and 13. However, as in the display screen 26 shown in FIG. 21, the plurality of preview images 66 corresponding to the angles α of visual recognition may be displayed in parallel in the preview display region 26B. Since the images are displayed in parallel, the user is able to check the plurality of preview images 66 having different angles α of visual recognition while comparing the plurality of preview images 66.

Figure 21:
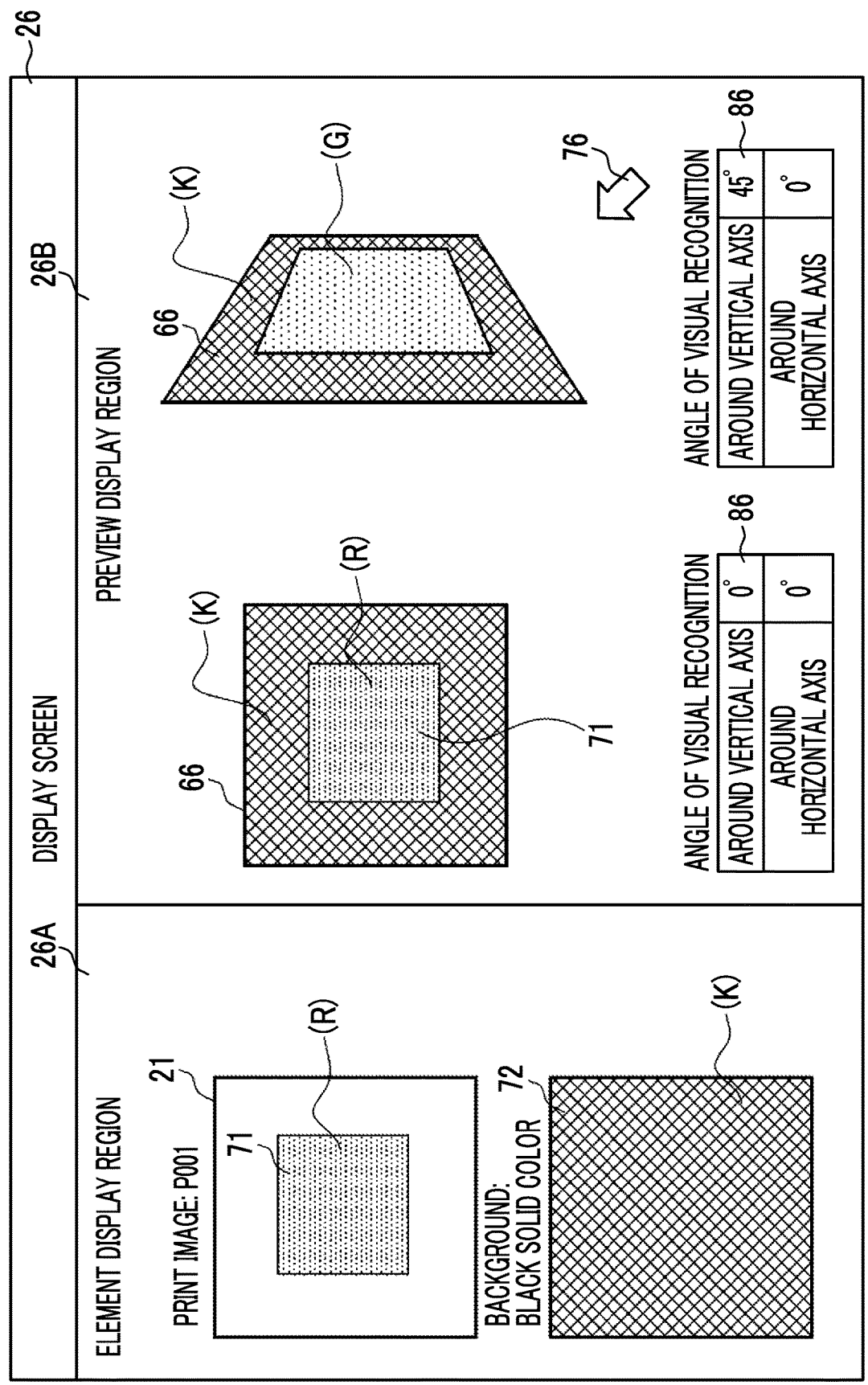
FIG. 21 is a diagram showing a display screen in which a plurality of preview images having different angles of visual recognition are displayed in parallel.

Further, as shown in FIG. 21, a third designation tool 86 for receiving the angle α of visual recognition through the input of an arbitrary numerical value may be provided as a tool for designating the angle α of visual recognition. The third designation tool 86 is, for example, a tool that is capable of designating both an angle around the vertical axis and an angle around the horizontal axis orthogonal to the vertical axis by inputting numerical values. Further, according to the third designation tool 86, it is possible to display the angle α designated for the plurality of preview images 66.

Figure 22:
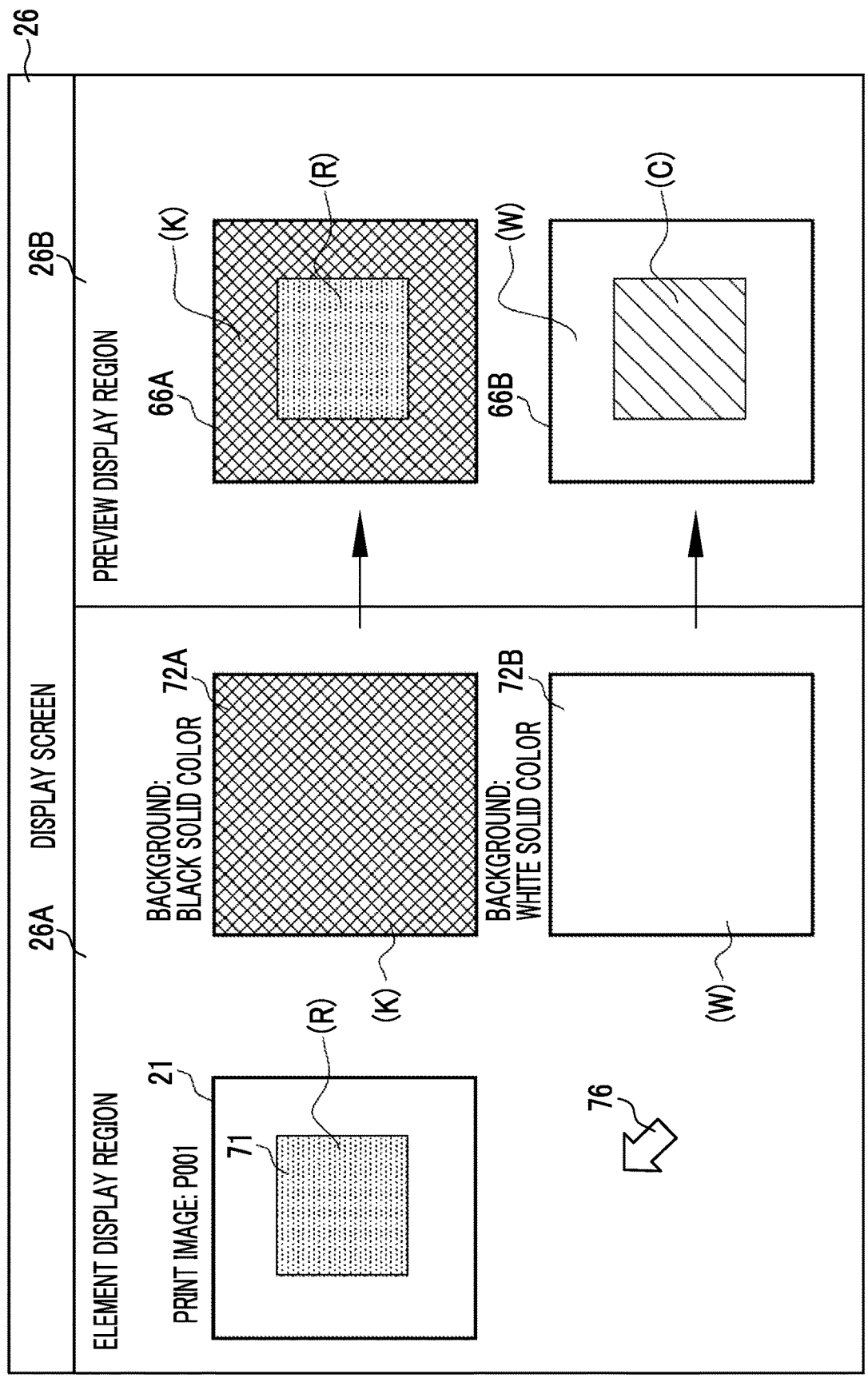
FIG. 22 is a diagram showing a display screen in which a plurality of preview images having different backgrounds are displayed in parallel.

As shown in FIG. 22, the plurality of preview images 66 in which different backgrounds 72 are combined may be displayed in parallel for one print image 21. In the example of FIG. 22, a preview image 66A, which is superimposed on a white solid color background 72A, and a preview image 66B, which is superimposed on a black solid color background 72B, are displayed in parallel for one print image 21. In FIG. 22, the background 72 of each of the plurality of preview images 66 may be optionally designated by the user, or a registered background selected by the processor 60 from a plurality of registered backgrounds registered in advance may be used. In such a manner, by displaying a plurality of preview images 66B having different backgrounds 72 in parallel, it is possible to check change in colors of the different backgrounds 72 while comparing the backgrounds.

Figure 23:
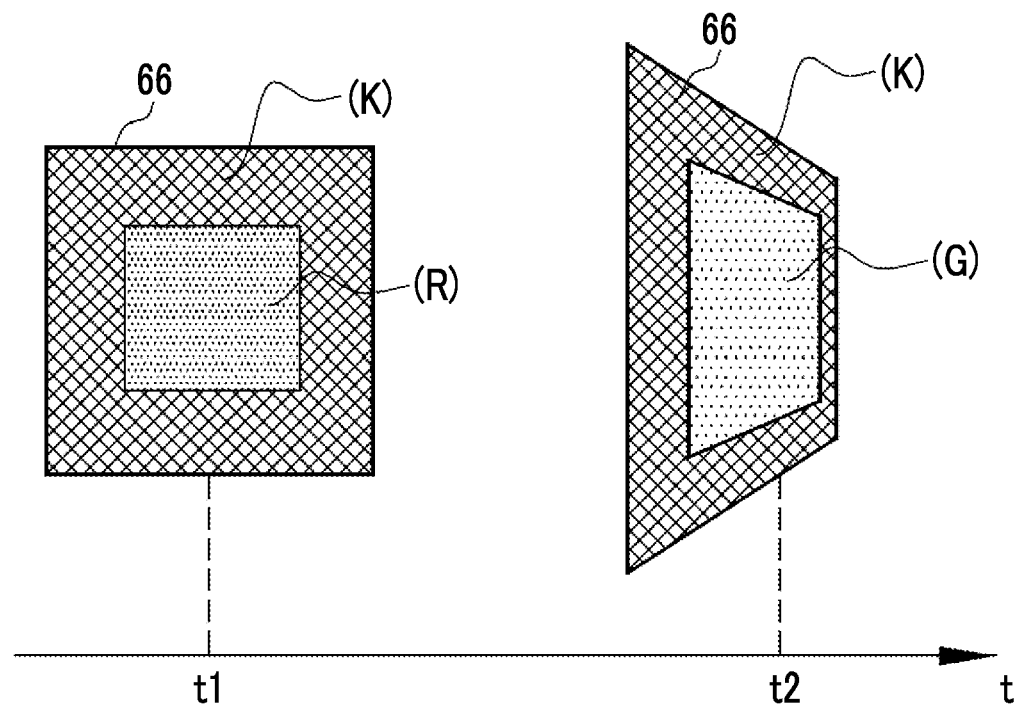
FIG. 23 is a diagram showing a display screen in which a plurality of preview images having different angles of visual recognition are switched and displayed.
Figure 24:
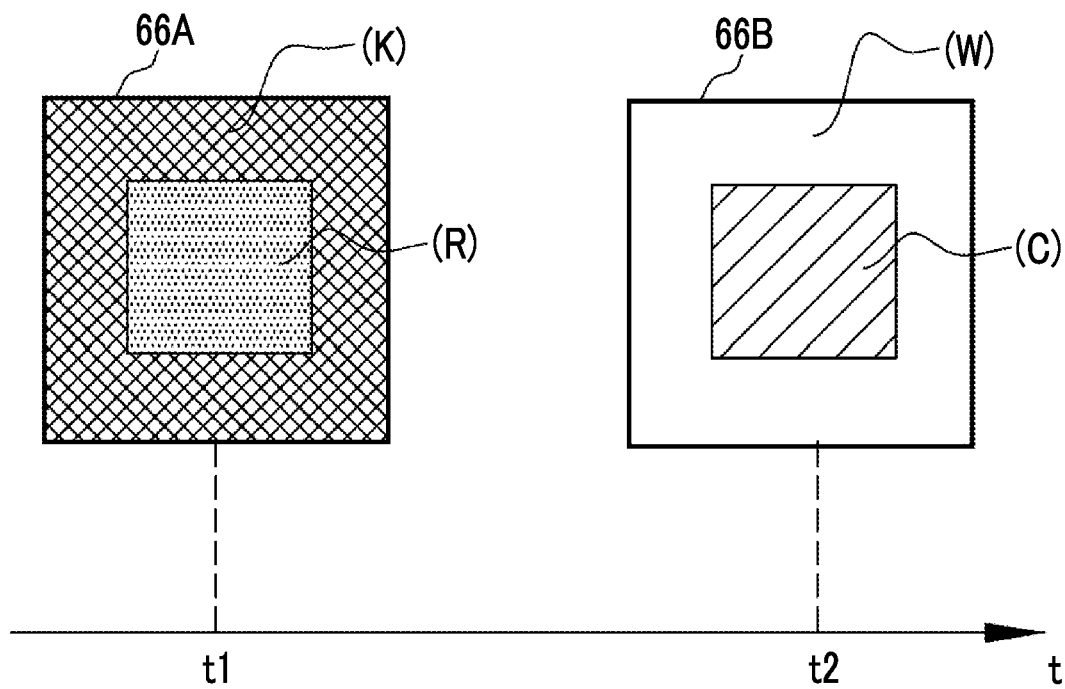
FIG. 24 is a diagram showing a display screen in which a plurality of preview images having different backgrounds are switched and displayed.

Further, as shown in FIGS. 23 and 24, the plurality of preview images 66 may be switched and displayed at set time intervals. The time interval may be set in advance, or any interval may be designated. A time interval of the switching is, for example, equal intervals, but does not have to be equal intervals. FIG. 23 is an example in which the plurality of preview images 66 having different angles α of visual recognition shown in FIG. 21 are displayed. FIG. 24 is an example in which a plurality of preview images 66A and a plurality of preview images 66B having different backgrounds 72 shown in FIG. 22 are displayed. According to this, there is an advantage in that the switching operation of the user is not required in a case where the plurality of preview images 66 are checked.

In a case of switching between the plurality of preview images 66, performance such as rotation of the preview images 66, fade-out of the preview images, or insertion of an animation may be added.

Further, the display screen 26 shown in FIG. 25 is a modification example of FIG. 21. The difference is that a fourth designation tool 87 is provided instead of the third designation tool 86 as a tool for designating the angle α of visual recognition. The fourth designation tool 87 is a tool for designating the angle α of visual recognition by selecting from a plurality of angles (for example, 0°, 45°, and 60°) which are set in advance. For example, radio buttons are provided corresponding to the plurality of angles, and the angle is designated by selecting the radio button by performing a click operation of the pointer 76.

Further, in FIG. 25, the angle α of visual recognition may not be arbitrarily designated by the user but may be set by the processor 60. In such a case, even in a case where there is no designation operation performed by the user, the processor 60 displays the plurality of preview images 66 corresponding to the plurality of angles α of visual recognition which are set in advance.

In the embodiment, the structural color ink 40 which causes change in color through color development due to the interference action of light caused by the structure has been described as an example of the structural color ink. In addition, the structural color ink may be a structural color ink that causes change in color through color development due to an optical phenomenon including at least one of interference, refraction, diffraction, or scattering caused by the structure. The processor 60 generates a preview image by executing color conversion processing according to the type of structural color ink.

The above-mentioned embodiment has described the example in which the background 72 using the normal ink 30 or the coloring agent 32 and the print image 21 using the structural color ink 40 are combined. However, the background 72 using the structural color ink 40 may be combined with the print image 21 using the structural color ink 40. In such a case, the preview image 66 is generated in consideration of color conversion based on the combination of the structural color ink 40 of the background 72 and the structural color ink 40 of the print image 21.

In the embodiments described above, for example, the following various processors can be used as the hardware structure of processing units executing various kinds of processing such as the display controller 62, the operation receiving unit 62A, and the preview image generation unit 62B. The various processors include, as described above, the CPU 52 which is a general-purpose processor that functions as various processing units in cooperation with software (AP 57 as an operation program), a programmable logic device (PLD) such as a field-programmable gate array (FPGA) which is a processor capable of changing a circuit configuration after manufacture, a dedicated electric circuit such as an application-specific integrated circuit (ASIC) which is a processor having a circuit configuration specifically designed to execute specific processing, and the like.

One processing unit may be formed of one of these various processors, or may be formed of a combination of two or more processors of the same type or different types (for example, a combination of a plurality of FPGAs and/or a combination of a CPU and an FPGA). Further, a plurality of processing units may be composed of one processor.

Examples of the plurality of processing units composed of one processor include, first, as represented by a computer such as a client and a server, a form in which one processor is composed of a combination of one or more CPUs and software, and the processor functions as the plurality of processing units. A second example of the configuration is an aspect in which a processor that implements the functions of the whole system including a plurality of processing units using one integrated circuit (IC) chip is used. A representative example of this aspect is a system-on-chip (SoC). As described above, the various processing units are configured using one or more of the various processors as a hardware structure.

Furthermore, specifically, an electric circuit (circuitry) obtained by combining circuit elements, such as semiconductor elements, can be used as the hardware structure of the various processors.

Various embodiments and/or various modification examples described above can also be appropriately combined in the technique of the present disclosure. It goes without saying that the technique of the present disclosure is not limited to each of the above embodiments and various configurations can be employed without departing from the gist. Furthermore, the technique of the present disclosure extends to a storage medium that non-temporarily stores a program, in addition to the program.

The descriptions and illustrations having been described above are the detailed description of parts according to the technique of the present disclosure, and are merely an example of the technique of the present disclosure. For example, description relating to the above configurations, functions, actions, and effects is description relating to an example of configurations, functions, actions, and effects of the parts according to the embodiment of the technique of the present disclosure. Therefore, unnecessary parts may be deleted or new elements may be added or replaced in the above descriptions and illustrations without departing from the gist of the technique of the present disclosure. Further, the description of common technical knowledge and the like, which allow the technique of the present disclosure to be embodied and do not need to be particularly described, is omitted in the descriptions and illustrations, which have been described above, to avoid complication and to facilitate the understanding of parts according to the technique of the present disclosure.

In the present specification, "A and/or B" is synonymous with "at least one of A or B". That is, the term "A and/or B" means only A, only B, or a combination of A and B. Further, in the present specification, the same meaning as "A and/or B" is applied even in a case where three or more items are expressed to be connected using "and/or".

All documents, patent applications, and technical standards described in the present specification are incorporated in the present specification by reference to the same extent as in a case where each of the documents, patent applications, and technical standards are specifically and individually indicated to be incorporated by reference.

What is claimed is:

1. A display control device that controls a display screen for displaying a preview of a print image to be printed on a recording medium by using an ink,
   in which the print image is printed using, as the ink, a structural color ink of which a color changes due to an optical phenomenon caused by a structure, and a color of the print image changes depending on an angle of visual recognition,
   the display control device comprising:
   a processor,
   wherein in a case where the print image is visually recognized at different angles, the processor is configured to display, on the display screen, a plurality of preview images corresponding to the angles by performing color conversion processing corresponding to the structural color ink.

2. The display control device according to claim 1, wherein the processor is configured to receive designation of the angles.

3. The display control device according to claim 2, wherein the processor is configured to
   display an object of which a posture is changeable through an operation of a user, on the display screen, and
   receive the designation of the angles in accordance with the posture of the object.

4. The display control device according to claim 3, wherein the object is the preview images.

5. The display control device according to claim 3, wherein the object is an object different from the preview images.

6. The display control device according to claim 2, wherein the designation of the angles is received by selecting the angles from a plurality of angles set in advance or by inputting an arbitrary numerical value.

7. The display control device according to claim 1, wherein the processor is configured to display a plurality of preview images corresponding to a plurality of angles set in advance.

8. The display control device according to claim 1, wherein the display screen is provided with a region for receiving designation of the angles.

9. A method of operating a display control device that controls a display screen for displaying a preview of a print image to be printed on a recording medium by using an ink,
   in which the print image is printed using, as the ink, a structural color ink of which a color changes due to an optical phenomenon caused by a structure, and a color of the print image changes depending on an angle of visual recognition, and
   the display control device includes a processor, the method comprising:
   in a case where the print image is visually recognized at different angles, executing, through the processor, processing of displaying, on the display screen, a plurality of preview images corresponding to the angles by performing color conversion processing corresponding to the structural color ink.

10. A non-transitory computer-readable storage medium storing a program for operating a display control device causing a computer to function as a display control device that controls a display screen for displaying a preview of a print image to be printed on a recording medium using an ink,
    in which the print image is printed using, as the ink, a structural color ink of which a color changes due to an optical phenomenon caused by a structure, and a color of the print image changes depending on an angle of visual recognition,
    the program causing the computer to execute, in a case where the print image is visually recognized at different angles, processing of displaying, on the display screen, a plurality of preview images corresponding to the angles by performing color conversion processing corresponding to the structural color ink.

* * * * *